(12) United States Patent
Lee

(10) Patent No.: US 9,253,501 B2
(45) Date of Patent: *Feb. 2, 2016

(54) METHOD AND APPARATUS FOR ENCODING MOTION INFORMATION, AND METHOD AND APPARATUS FOR DECODING SAME

(71) Applicant: SAMSUNG ELECTRONICS CO., LTD., Suwon-si (KR)

(72) Inventor: Tammy Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,501

(22) Filed: Feb. 13, 2015

(65) Prior Publication Data

US 2015/0156509 A1  Jun. 4, 2015

Related U.S. Application Data

(63) Continuation of application No. 14/129,813, filed as application No. PCT/KR2012/005091 on Jun. 27, 2012.

(60) Provisional application No. 61/501,300, filed on Jun. 27, 2011.

(51) Int. Cl.
  *H04N 19/513* (2014.01)
  *H04N 19/44* (2014.01)
  (Continued)

(52) U.S. Cl.
  CPC ....... *H04N 19/513* (2014.11); *H04N 19/00763* (2013.01); *H04N 19/11* (2014.11); *H04N 19/44* (2014.11); *H04N 19/52* (2014.01); *H04N 19/573* (2014.11); *H04N 19/577* (2014.11)

(58) Field of Classification Search
  None
  See application file for complete search history.

(56) References Cited

U.S. PATENT DOCUMENTS

| 2008/0056365 A1 | 3/2008 | Igarashi |
| 2011/0129016 A1 | 6/2011 | Sekiguchi et al. |

(Continued)

FOREIGN PATENT DOCUMENTS

| JP | 2002-165109 A | 6/2002 |
| JP | 2007-525100 A | 8/2007 |

(Continued)

OTHER PUBLICATIONS

International Search Report (PCT/ISA/210) dated Dec. 27, 2012, issued in International Application No. PCT/KR2012/005091.
Written Opinion (PCT/ISA/237) dated Dec. 27, 2012, issued in International Application No. PCT/KR2012/005091.
Supplementary European Search Report mailed Jan. 20, 2015 in European Application No. EP 12 80 5144.

(Continued)

*Primary Examiner* — Christopher S Kelley
*Assistant Examiner* — Kaitlin A Retallick
(74) *Attorney, Agent, or Firm* — Sughrue Mion, PLLC

(57) ABSTRACT

A method and apparatus for encoding and decoding motion information. The encoding method includes determining whether motion information of spatial prediction units that are spatially collocated to a current prediction unit and motion information of temporal prediction units that are temporally collocated to the current prediction are available; when the number of the motion information of the spatial prediction units and the motion information of the temporal prediction units is less than a predetermined number, generating additional candidate motion information by using the available motion information of the spatial prediction units and the motion information of the temporal prediction units such that the total number of pieces of candidate motion information is the predetermined number; and decoding motion information of the current prediction unit by using the 'n' pieces of motion information.

1 Claim, 20 Drawing Sheets

(51) Int. Cl.
*H04N 19/593* (2014.01)
*H04N 19/52* (2014.01)
*H04N 19/11* (2014.01)
*H04N 19/573* (2014.01)
*H04N 19/577* (2014.01)

(56) References Cited

U.S. PATENT DOCUMENTS

| | | | |
|---|---|---|---|
| 2011/0299599 A1 | 12/2011 | Bossen | |
| 2012/0257678 A1* | 10/2012 | Zhou et al. | H04N 19/436 375/240.16 |
| 2012/0269274 A1 | 10/2012 | Kim et al. | |
| 2012/0300846 A1 | 11/2012 | Sugio et al. | |
| 2012/0320969 A1 | 12/2012 | Zheng et al. | |
| 2012/0328021 A1 | 12/2012 | Sugio et al. | |
| 2013/0128983 A1 | 5/2013 | Sugio et al. | |
| 2013/0243097 A1 | 9/2013 | Murakami et al. | |
| 2014/0140408 A1 | 5/2014 | Lee et al. | |
| 2014/0153647 A1 | 6/2014 | Nakamura et al. | |
| 2014/0226725 A1 | 8/2014 | Lin et al. | |
| 2015/0181220 A1 | 6/2015 | Sugio et al. | |

FOREIGN PATENT DOCUMENTS

| | | |
|---|---|---|
| JP | 2008-61133 A | 3/2008 |
| JP | 2012-151576 A | 8/2012 |
| JP | 2012-253459 A | 12/2012 |
| JP | 2012-253460 A | 12/2012 |
| JP | 2014-501471 A | 1/2014 |
| JP | 2014-520453 A | 8/2014 |
| JP | 2014-520484 A | 8/2014 |
| KR | 10-2011-0036521 A | 4/2011 |
| KR | 10-2011-0040893 A | 4/2011 |
| KR | 10-2012-0138706 A | 12/2012 |
| WO | 2012/090495 A1 | 7/2012 |
| WO | 2012/122927 A1 | 9/2012 |
| WO | 2012/128540 A2 | 9/2012 |
| WO | 2012/160803 A1 | 11/2012 |
| WO | 2012/164886 A1 | 12/2012 |
| WO | 2012/164908 A1 | 12/2012 |
| WO | 2012/164924 A1 | 12/2012 |
| WO | 2012/177387 A1 | 12/2012 |

OTHER PUBLICATIONS

Office Action dated Dec. 9, 2014 in Japanese Application No. 2014-518798.
Laroche G et al., "RD Optimized Coding for Motion Vector Predictor Selection," Sep. 2008, pp. 1249-1252, vol. 18, No. 9, IEEE Service Center, Pascataway, NJ, USA.
Jung, Joel et al., "Competition-Based Scheme for Motion Vector Selection and Coding", Aug. 2006, Klagerfurt, Austria.
Han, Woo-Jin et al., "Improved Video Compression Efficiency Through Flexible Unit Representation and Corresponding Extension of Coding Tool," Dec. 2010, pp. 1709-1720, vol. 20, No. 12.
Li et al., "Direct Mode Coding for Bipredictive Slices in the H.264 Standard", IEEE Transactions on Circuits and Systems for Video Technology; Jan. 2005, pp. 119-126, vol. 15 No. 1, IEEE Service Center, Piscataway, NJ, US.
Tourapis, Alexis Michael et al., "Direct Mode Coding for Bipredictive Slices in the H.264 Standard", Jan. 2005, pp. 119-126, vol. 15, No. 1.
Communication dated May 9, 2014 from the Korean Intellectual Property Office in a counterpart Korean application No. 10-2012-0069479.
Communication dated Jan. 20, 2015 issued by European Patent Office in counterpart European Patent Application No. 12805114.8.
Communication dated Dec. 9, 2014 issued by Japanese Patent Office in counterpart Japanese Patent Application No. 2014-518798.
Communication dated Jun. 19, 2015 issued by Korean Intellectual Property Office in counterpart Korean Application No. 10-2014-0059296.
Communication dated Jul. 16, 2015 issued by Korean Intellectual Properly Office in counterpart Korean Patent Application No. 10-2014-0145394.
Chen, et al.; "MVP Index Parsing with Fixed Number of Candidates", Joint Collaborative Team on Video Coding (JCT-VC) of ITU-T SG16 WP3 and ISO/IEC JTC1/SC29/WG11, Jul. 2011, 18 pages total.
Sugio, et al.; "Parsing Robustness for Merge/AMVP", Joint Collaborative Team on Video Coding (JCT-VC) of ITU-T SG16 WP3 and ISO/IEC JTC1/SC29/WG11, Jul. 2011, 16 pages total.
Communication dated Nov. 23, 2015 issued by the European Patent Office in counterpart European Application No. 12805144.8.
Communication dated Sep. 8, 2015, issued by the Japanese Patent Office in counterpart Japanese Application No. 2014-518798.

* cited by examiner

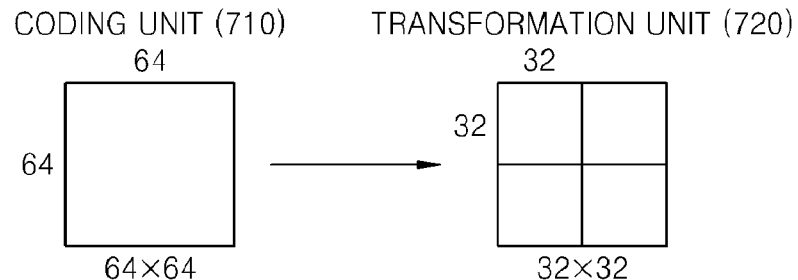
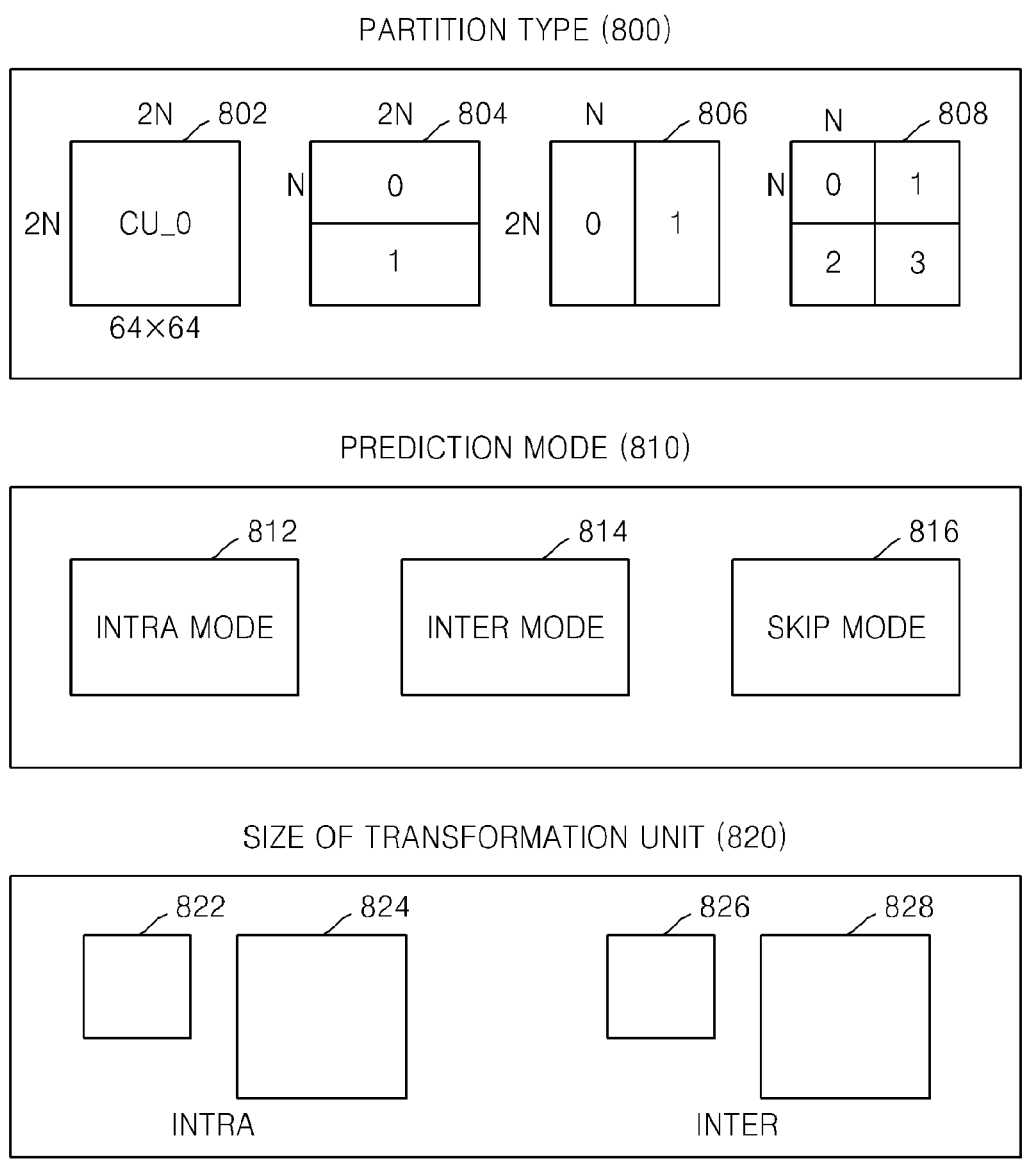

CODING UNIT (1010)

PREDICTION UNIT (1060)

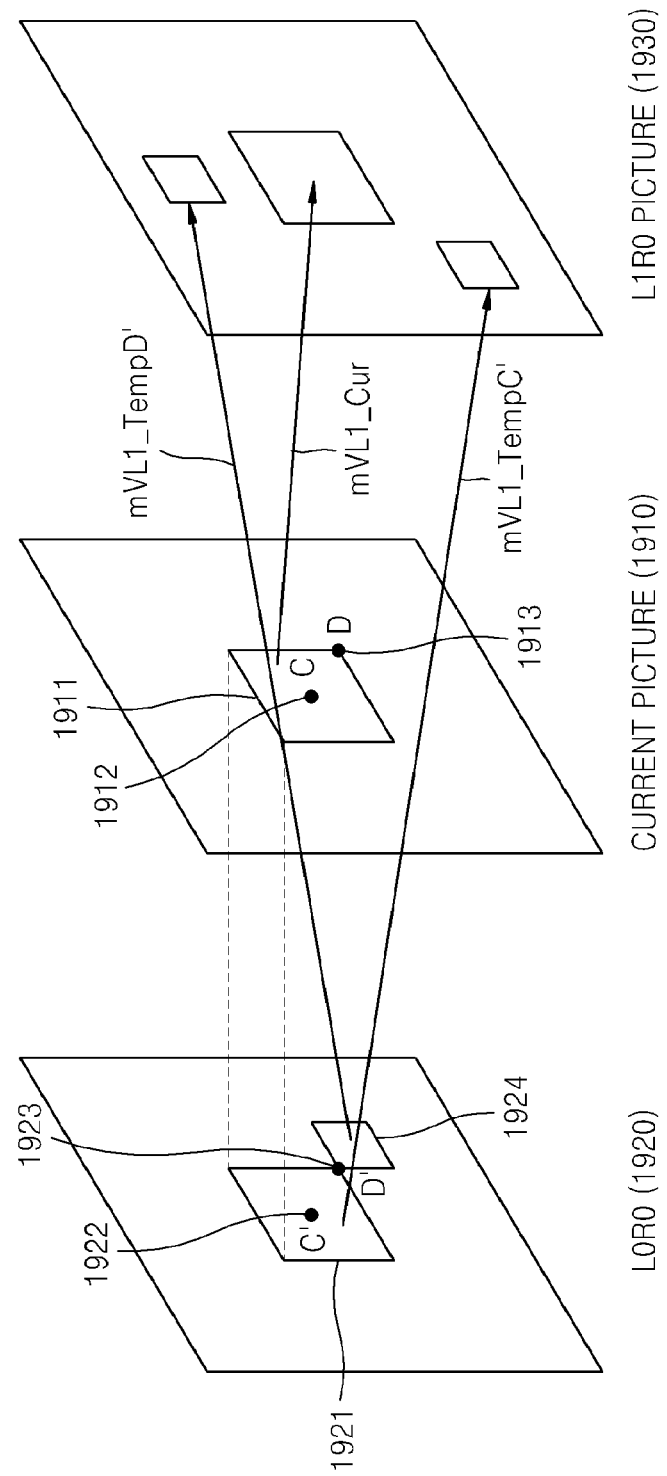

METHOD AND APPARATUS FOR ENCODING MOTION INFORMATION, AND METHOD AND APPARATUS FOR DECODING SAME

CROSS-REFERENCE TO RELATED PATENT APPLICATION

This application is a continuation of U.S. application Ser. No. 14/129,813, filed Dec. 27, 2013, which is a national stage entry under 35 U.S.C. §371(c) of International Patent Application No. PCT/KR2012/005091, filed Jun. 27, 2012, and claims the benefit of U.S. Provisional Patent Application No. 61/501,300, filed on Jun. 27, 2011, in the U.S. Patent and Trademark Office, the disclosures of which are incorporated herein in its entirety by reference.

BACKGROUND

1. Technical Field

One or more exemplary embodiments relates to a method and apparatus for encoding and decoding motion information, and more particularly, to a method and apparatus for effectively encoding and decoding motion information of a current prediction unit.

2. Prior Art

Recently, as high definition video contents have become widely used, a need for a video codec having a higher coding efficiency than a conventional video codec such as MPEG-4 H.264/MPEG-4 advanced video coding (AVC) has increased.

According to motion compensation that is a technology for removing temporal redundancy in a video signal, compression efficiency is increased by transmitting a residual signal that is a difference value between an original video signal and a reference signal indicated by a motion vector. In general, a motion vector and a residual value of each block, as an encoding result obtained by encoding each block by using motion compensation, are transmitted to a decoder. Since motion vectors of each block occupy a considerable amount of an encoded bitstream, information about a motion vector assigned to each block needs to be reduced in order to increase compression efficiency.

In order to reduce transmission overhead during encoding of a motion vector, a motion vector of a previous block is used as a prediction motion vector of a current block in a conventional MPEG-2 codec, and a median of motion vectors of previously encoded blocks that are adjacent to a left side, an upper side, and an above-right side of a current block is used as a prediction motion vector of the current block in a codec such as MPEG-4 H.264/MPEG-4 AVC.

SUMMARY

One or more exemplary embodiment provides a method and apparatus for effectively encoding and decoding motion information of a current prediction unit.

According to one or more exemplary embodiment, various candidate motion information are generated by using motion information of prediction units that are spatially collocated to a current prediction unit and motion information of prediction units that are temporally collocated to the current prediction unit.

According to one or more exemplary embodiment, compression efficiency of an image may be increased by using various motion candidates obtained based on motion information of an adjacent prediction unit.

According to an aspect of one or more exemplary embodiments, there is provided a method of encoding motion information including performing motion prediction on a current prediction unit to obtain motion information about the current prediction unit; determining whether motion information of spatial prediction units that are spatially collocated to a current prediction unit and motion information of temporal prediction units that are temporally collocated to the current prediction unit are available; as a result of the determining, when the number of the motion information of the spatial prediction units and the motion information of the temporal prediction units is less than a predetermined number 'n' (where n is an integer), generating additional candidate motion information by using the available motion information of the spatial prediction units and the motion information of the temporal prediction units such that the total number of pieces of candidate motion information is 'n'; and encoding motion information of the current prediction unit by using the 'n' pieces of motion information.

The determining may include searching predetermined prediction units positioned above the current prediction unit in a predetermined scanning order and selecting motion information of a first upper prediction unit having available motion information as an upper spatial motion information candidate of the current prediction unit; searching predetermined prediction units positioned on the left of the current prediction unit in a predetermined scanning order and selecting motion information of a first left prediction unit having available motion information as a left spatial motion information candidate of the current prediction unit; and selecting motion information of a prediction unit of a previous picture selected from the previous picture, based on a prediction unit of a previous picture having the same location as the current prediction unit, as temporal motion information candidate of the current prediction unit, wherein the generating of the additional candidate motion information is performed when the total number of pieces of candidate motion information obtained by using the upper spatial motion information candidate, the left spatial motion information candidate, and the temporal motion information candidate is less than 'n'.

The generating of the additional candidate motion information may include generating motion information of an available upper prediction unit that is searched for after a first upper prediction unit having available motion information is searched for, as the additional candidate motion information, in a predetermined scanning order.

The generating of the additional candidate motion information may include generating the additional candidate motion information having motion information of an available left prediction unit that is searched for after a first left prediction unit having available motion information is searched for, in the predetermined scanning order.

The generating of the additional candidate motion information may include scaling motion information of a prediction unit of a previous picture having motion information from among remaining prediction units of the previous picture except for a prediction unit of a first previous picture having available motion information and generating the additional candidate motion information, when prediction units of a previous picture, which is determined based on a prediction unit of a previous picture having the same location as the current prediction unit, are scanned in a predetermined scanning order.

The determining may include selecting motion information of predetermined spatial prediction units of which locations are previously determined from among predetermined prediction units positioned above and on the left of the current prediction unit, as a spatial motion information candidate of the current prediction unit; selecting motion information of a prediction unit of a previous picture selected from the previous picture based on a prediction unit of a previous picture having the same location as the current prediction unit, as a temporal motion information candidate of the current prediction unit, wherein the generating of the additional candidate motion information is performed when a total number of pieces of candidate motion information obtained by using the spatial motion information candidate and the temporal motion information candidate is less than 'n'.

The generating of the additional candidate motion information may include generating predetermined motion information that is previously determined, as the additional candidate motion information. The predetermined motion information may be motion vector having a predetermined value, a reference picture index having a predetermined value, and reference direction information according to a slice type to which a current prediction belongs.

The generating of the additional candidate motion information may include, when motion information of the available spatial prediction units and temporal prediction units includes bi-directional motion vector information of prediction of a direction L0 and a direction L1, generating the additional candidate motion information by adding and subtracting a predetermined offset to and from a motion vector of the prediction of the direction L0 and a motion vector of the prediction of the direction L1.

When a first reference picture used in the prediction of the direction L0 and a second reference picture used in the prediction of the direction L1 are positioned on the same location based on a current picture including the current prediction unit, the offset may be added to the motion vector of the prediction of the direction L0 and the motion vector of the prediction of the direction L1, and when the current picture is positioned between the first reference picture used in the prediction of the direction L0 and the second reference picture used in the prediction of the direction L1, the offset may be added to the motion vector of the prediction of the direction L0 and a value obtained by multiplying the offset by −1 is added to the motion vector of the prediction of the direction L1.

The generating of the additional candidate motion information may include changing prediction directions of motion information of the available spatial prediction units and motion information of the available temporal prediction units to generate the additional candidate motion information.

The generating of the additional candidate motion information may include, when the motion information of the available spatial prediction units and the motion information of the available temporal prediction units include bi-directional motion vector information of the prediction unit of the direction L0 and the prediction unit of the direction L1, generating the additional candidate motion information by using uni-directional motion information of one temporal prediction unit selected from the direction of the direction L0 and the direction of the direction L1.

The generating of the additional candidate motion information may include, when motion information of the available spatial prediction units and motion information of the available temporal prediction units include uni-directional motion information of one temporal prediction unit selected from the direction of the direction L0 and the direction of the direction L1, generating the additional candidate motion information by using bi-directional motion information obtained by combining the prediction of the direction L0 and the prediction of the direction L1.

The generating of the additional candidate motion information may include, when motion information of the available spatial prediction units and motion information of the available temporal prediction units include uni-directional motion information of one selected from the direction of the direction L0 and the direction of the direction L1, generating bi-directional motion information by combining uni-directional motion information including a motion vector having a predetermined component value, as the additional candidate motion information.

In addition, the generating of the additional candidate motion information may include generating a reference picture having a reference picture index having a predetermined value as the additional candidate motion information.

In the generating of the additional candidate motion information, whether default candidate motion information and the generated additional candidate motion information are duplicated may not be checked, and the generated additional candidate motion information may be added to candidate motion information.

According to another aspect of one or more exemplary embodiments, there is provided an apparatus for encoding motion information, including a candidate motion information generating unit for performing motion prediction on a current prediction unit to obtain motion information about the current prediction unit, for determining whether motion information of spatial prediction units that are spatially collocated to a current prediction unit and motion information of temporal prediction units that are temporally collocated to the current prediction unit are available, and as a result of the determining, when the number of the motion information of the spatial prediction units and the motion information of the temporal prediction units is less than a predetermined number 'n' (where n is an integer), for generating additional candidate motion information by using the available motion information of the spatial prediction units and the motion information of the temporal prediction units such that the total number of pieces of candidate motion information is 'n'; and a motion information encoder for encoding motion information of the current prediction unit by using the 'n' pieces of motion information.

According to another aspect of one or more exemplary embodiments, there is provided a method of decoding motion information, including determining whether motion information of spatial prediction units that are spatially collocated to a current prediction unit and motion information of temporal prediction units that are temporally collocated to the current prediction unit are available; as a result of the determining, when the number of the motion information of the spatial prediction units and the motion information of the temporal prediction units is less than a predetermined number 'n' (where n is an integer), generating additional candidate motion information by using the available motion information of the spatial prediction units and the motion information of the temporal prediction units such that the total number of pieces of candidate motion information is 'n'; obtaining index information indicating single motion information from among the 'n' pieces of candidate motion information from a bitstream; and obtaining motion information of the current prediction unit by using motion information indicated by the index.

According to another aspect one or more exemplary embodiments, there is provided an apparatus for decoding motion information, including a generating unit for determining whether motion information of spatial prediction units that are spatially collocated to a current prediction unit and motion information of temporal prediction units that are temporally collocated to the current prediction unit are available, and as a result of the determining, when the number of the motion information of the spatial prediction units and the motion information of the temporal prediction units is less than a predetermined number 'n' (where n is an integer), for generating additional candidate motion information by using the available motion information of the spatial prediction units and the motion information of the temporal prediction units such that the total number of pieces of candidate motion information is 'n'; an entropy decoder for obtaining index information indicating single motion information from among the 'n' pieces of candidate motion information from a bitstream; and a motion information decoder for obtaining motion information of the current prediction unit by using motion information indicated by the index.

BRIEF DESCRIPTION OF THE DRAWINGS

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 19 is a reference diagram for explaining a process of generating temporal candidate motion information, according to an exemplary embodiment;

DETAILED DESCRIPTION

Hereinafter, one or more exemplary embodiments will be described more fully with reference to the accompanying drawings.

Figure 1:
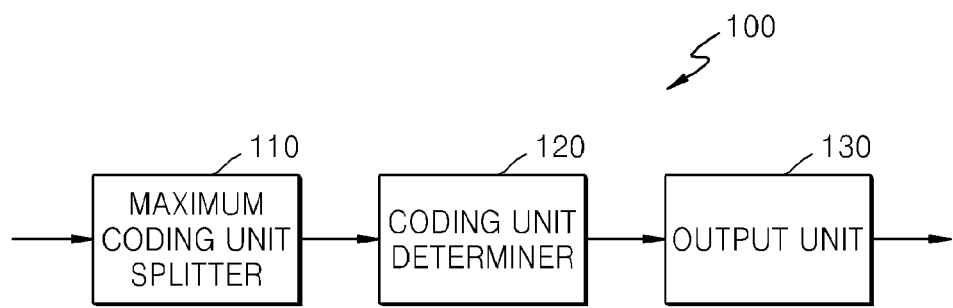
FIG. 1 is a block diagram of an apparatus for encoding a video, according to an exemplary embodiment.

FIG. 1 is a block diagram of a video encoding apparatus 100, according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to one or more exemplary embodiments may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to one or more exemplary embodiments is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or smaller than the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to a same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to a prediction unit, and a size of a transformation unit for transformation.

Coding units according to a tree structure in a maximum coding unit and a method of determining a partition, according to one or more exemplary embodiments, will be described in detail later with reference to FIGS. 3 through 12.

The coding unit determiner 120 may measure an encoding error of deeper coding units according to depths by using rate-distortion optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large data amount is encoded using conventional macroblocks, the number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted based on characteristics of an image, for example, increasing a maximum size of a coding unit based on a size of the image.

Figure 2:
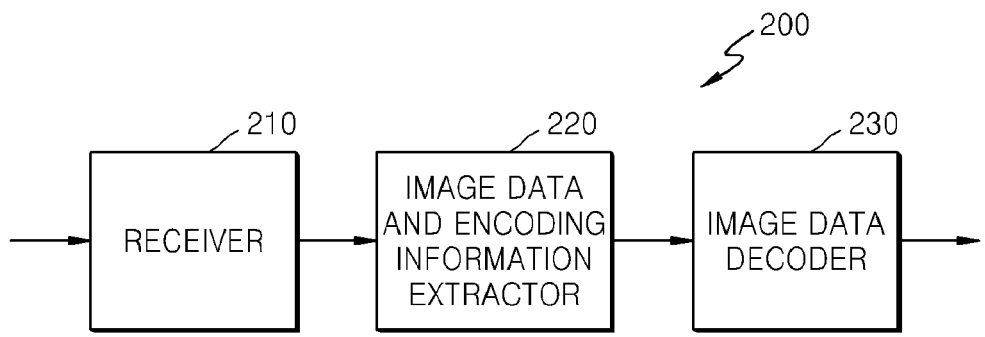
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
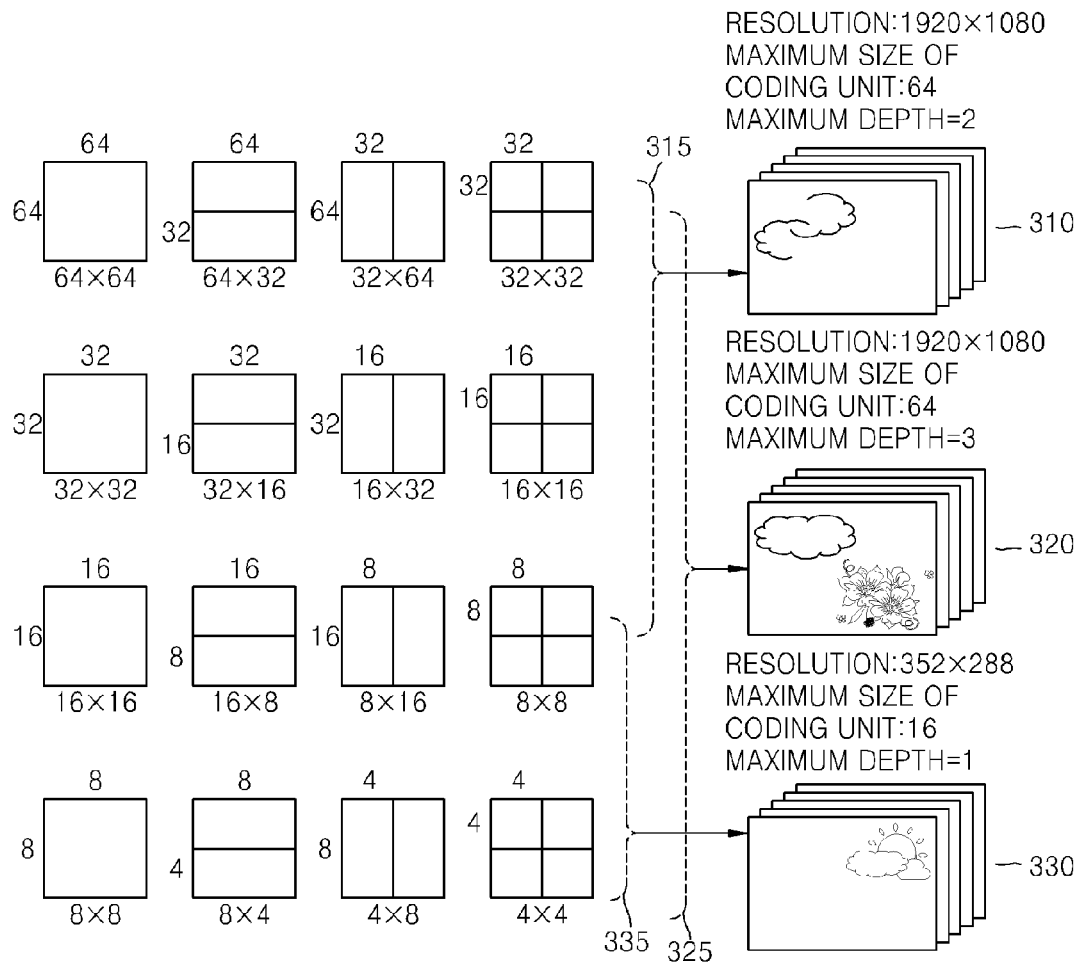
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened up to two layers by splitting the maximum coding unit up to two times. Meanwhile, since the maximum depth of the video data 330 is 1, coding units 335 of the video data 330 may include a maximum coding unit having a long axis size of 16, and coding units having a long axis size of 8 since depths are deepened up to one layer by splitting the maximum coding unit up to one time.

Since the maximum depth of the video data 320 is 3, coding units 325 of the video data 320 may include a maximum coding unit having a long axis size of 64, and coding units having long axis sizes of 32, 16, and 8 since the depths are deepened up to 3 layers by splitting the maximum coding unit up to three times. As a depth deepens, detailed information may be precisely expressed.

Figure 4:
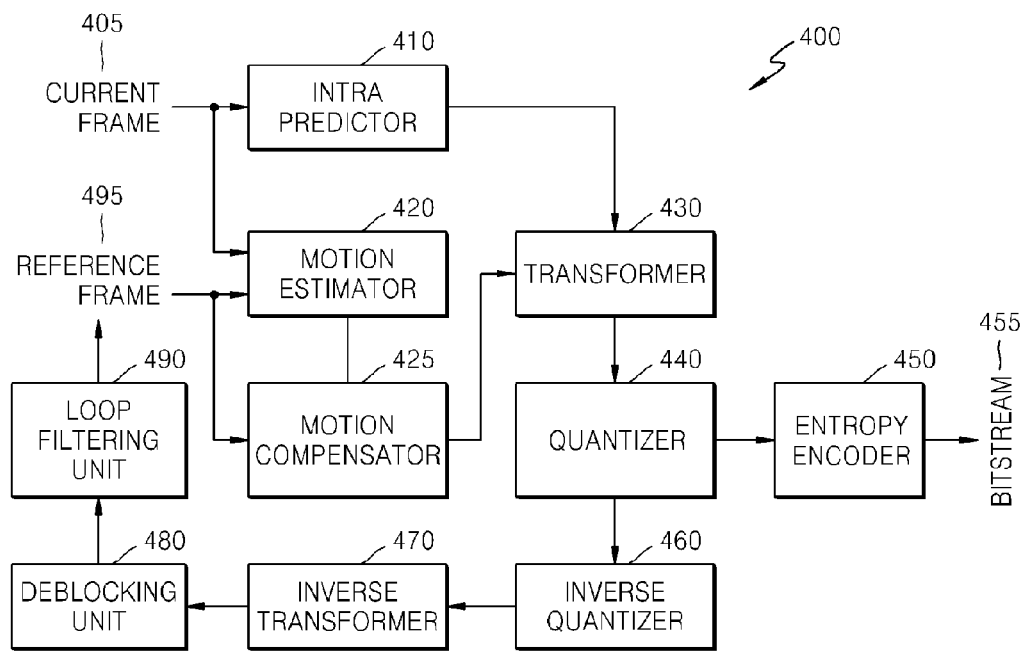
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
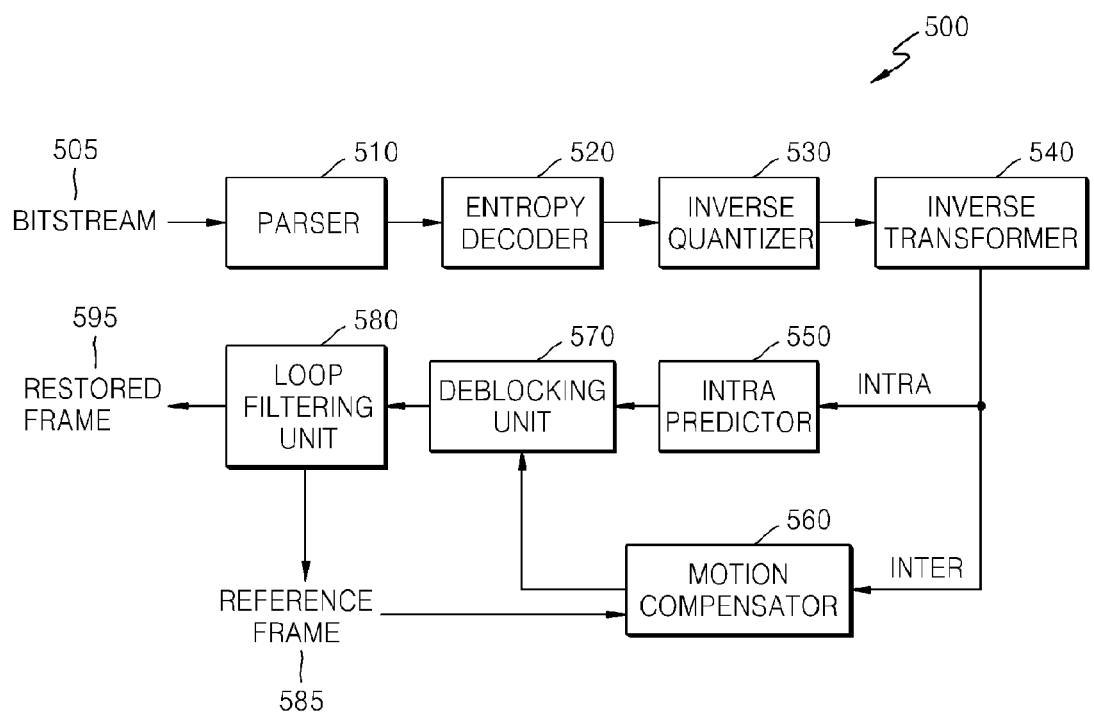
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data, which is post-processed through the deblocking unit 570 and the loop filtering unit 580, may be output as the reference frame 585.

In order to decode the image data in the image data decoder 230 of the video decoding apparatus 200, the image decoder 500 may perform operations that are performed after operations of the parser 510 are performed.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
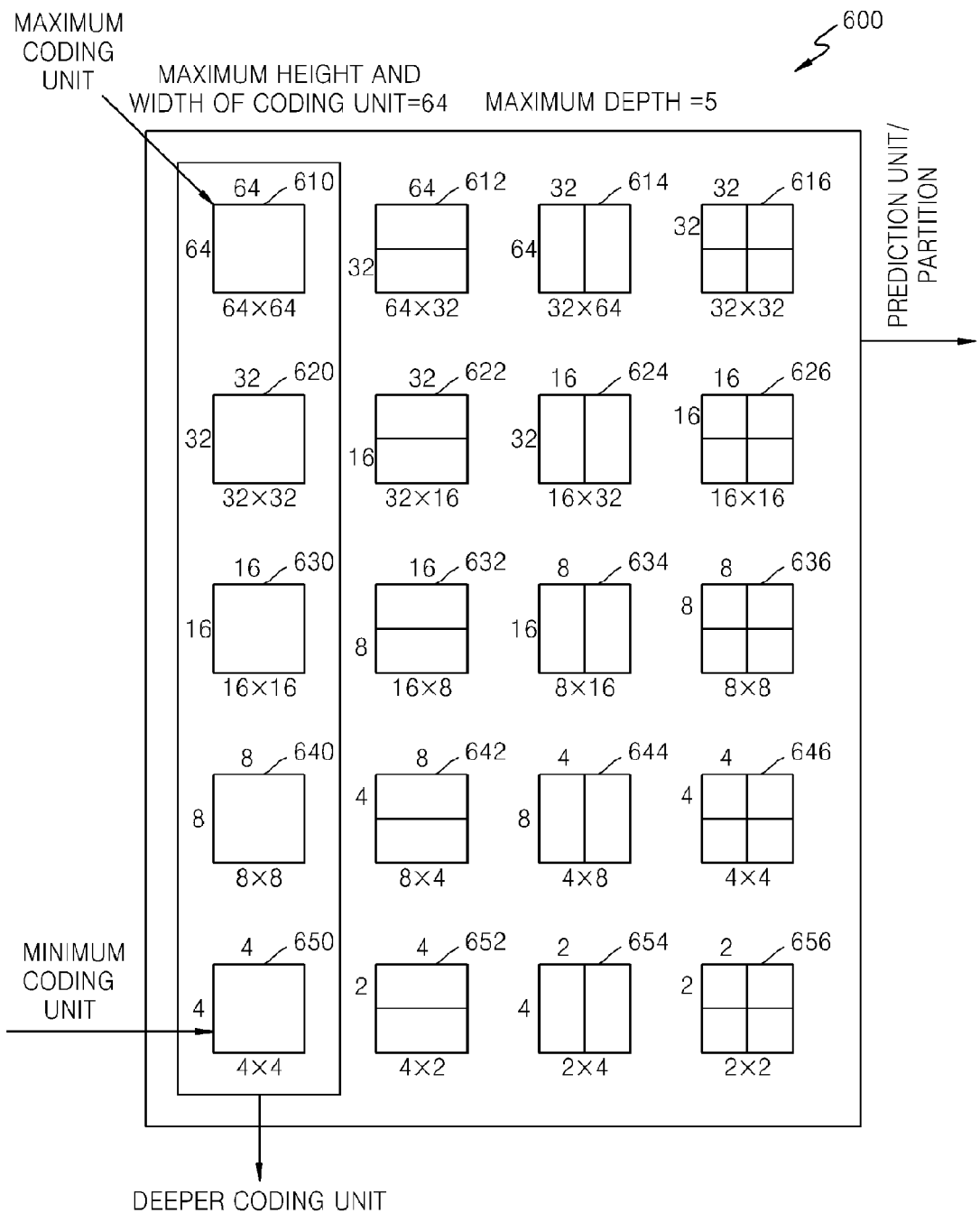
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 may use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition in the coding unit 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition in the coding unit 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 may be split into partitions included in the coding unit 650, i.e. a partition having a size of 4×4 included in the coding unit 650, partitions 652 having a size of 4×2, partitions 654 having a size of 2×4, and partitions 656 having a size of 2×2.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 encodes or the video decoding apparatus decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
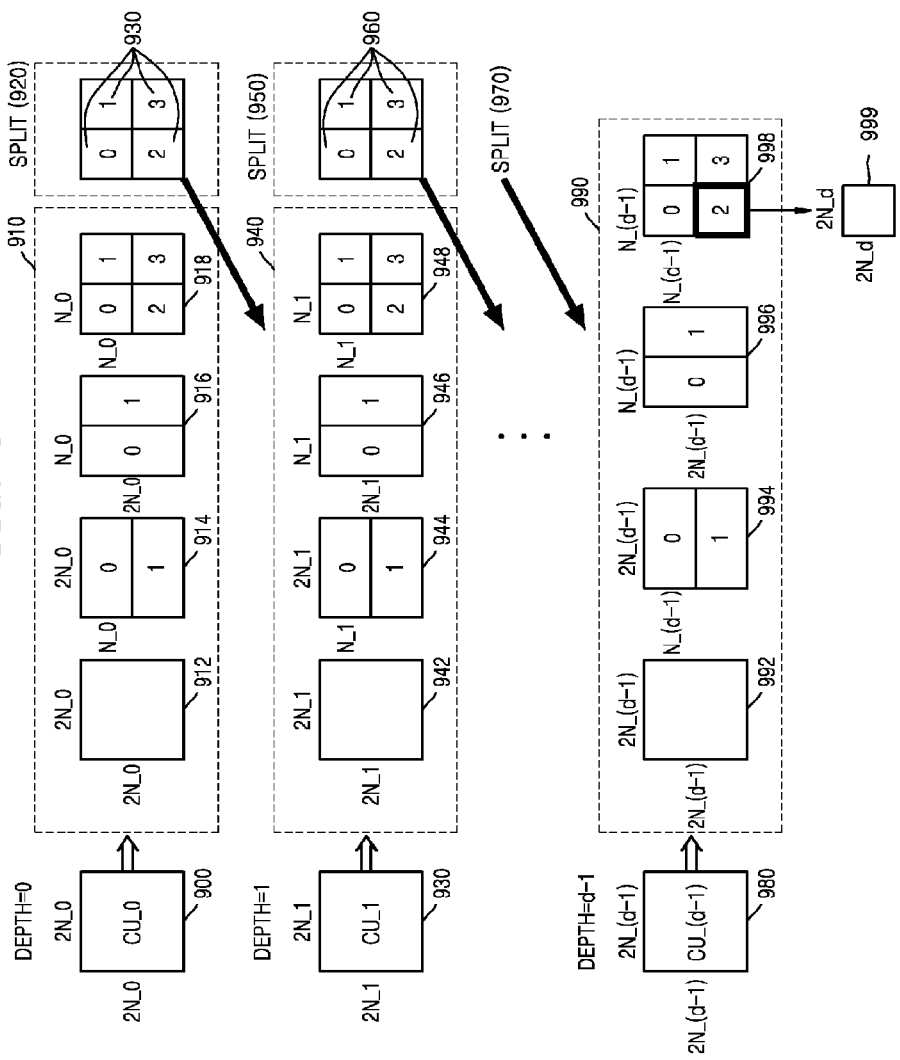
FIG. 9 is a diagram of deeper coding units according to depths, according to an exemplary embodiment.

The image data and encoding information extractor 220 of the video decoding apparatus 200 may extract and use the information 800, 810, and 820 for decoding, according to each deeper coding unit FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
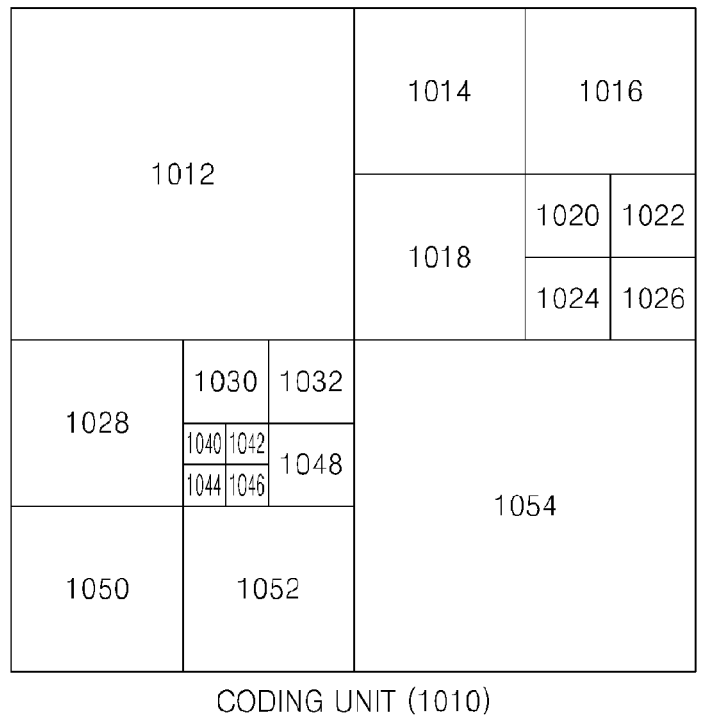
FIGS. 10 through 12 are diagrams for describing a relationship between coding units, prediction units, and transformation units, according to an exemplary embodiment.
Figure 11:
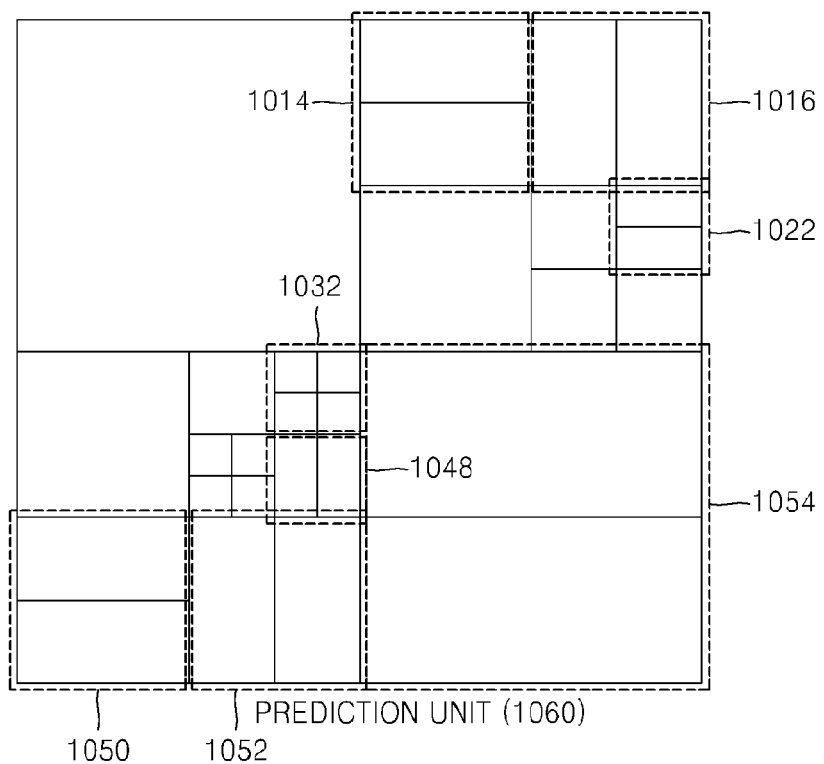
Figure 12:
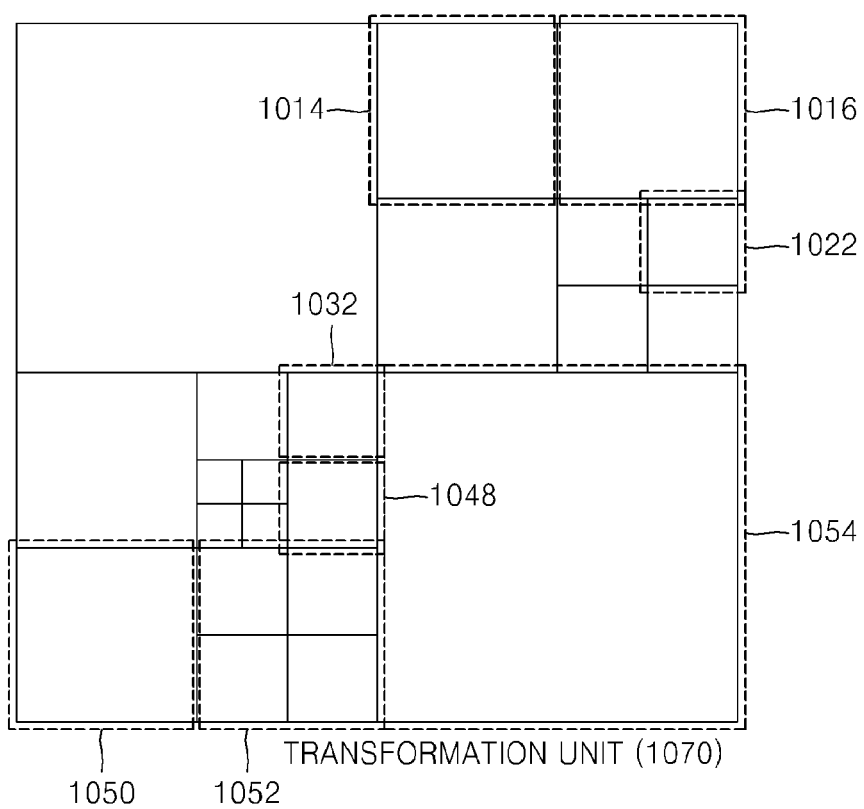

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
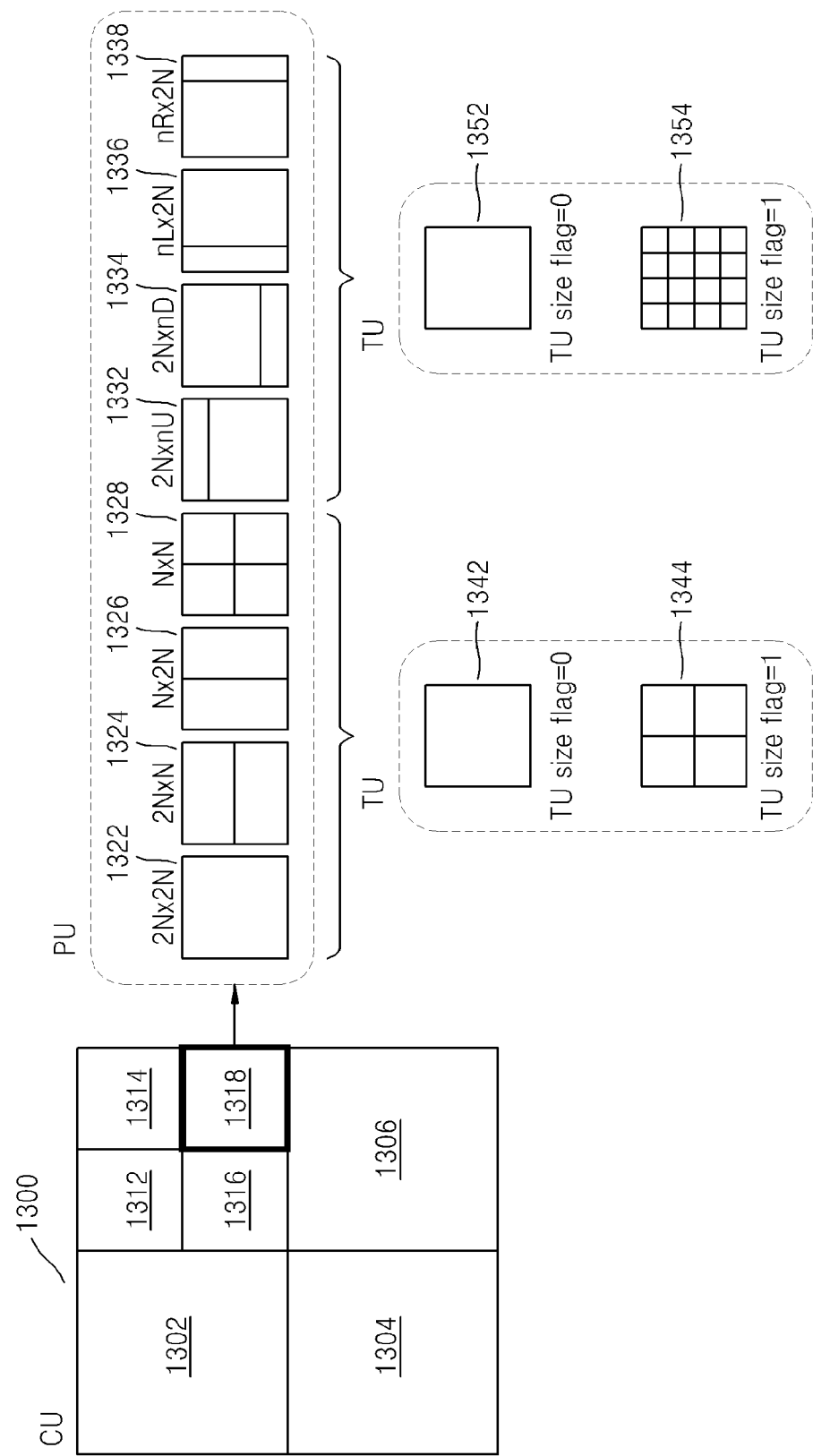
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Hereinafter, motion prediction and motion compensation, which are performed by the motion estimator 420 and the motion compensator 425 of the video encoding apparatus 100 of FIG. 4 and the motion compensator 550 of the video decoding apparatus 200 of FIG. 5, and processes of encoding and decoding motion information, which are performed by the entropy encoder 450 of FIG. 4 and the entropy decoder 520 of FIG. 5, will be described. As described with reference to FIGS. 1 through 13, a prediction unit is a data unit for prediction encoding of a coding unit. Hereinafter, the prediction unit refers to the prediction unit itself or a partition obtained by splitting the prediction unit.

As described above, prediction units are encoded by using various prediction modes such as an intra prediction mode, an inter mode, and a skip mode.

In the inter prediction mode, a current prediction unit is predicted via uni-direction prediction or bi-directional prediction. In detail, a prediction unit included in a P slice is predicted via uni-direction prediction using only one of a reference picture 'L0 picture' included in a reference picture list 'List 0' and a reference picture 'L1 picture' included in a reference picture list 'List 1'. A prediction method using the reference picture 'L0 picture' included in the reference picture list 'List 0' is referred to as "L0 prediction". A prediction method using the reference picture 'L1 picture' included in the reference picture list 'List 1' is referred to as "L1 prediction". In the reference picture list 'List 0', a reference picture index is assigned in order from a latest past picture to a previous picture thereto and then is assigned in order from a closest future picture to a next picture thereafter. On the other hand, in the reference picture list 'list 1', a reference picture index is assigned in order from a closest future picture to a next picture thereafter and then is assigned in order from a latest past picture to a previous picture thereto.

A prediction unit included in a B slice is predicted via uni-direction prediction or bi-directional prediction using an average of the reference picture 'L0 picture' included in the reference picture list 'List 0' and the reference picture 'L1 picture' included in the reference picture list 'list 1'. A bi-direction predictive mode performed by the motion estimator 420 may use two reference pictures rather than being limited to a previous or next reference picture of a current picture and may be referred to as a bi-predictive mode.

Costs obtained by encoding prediction values obtained according to the prediction modes are compared with each other and a prediction mode having a smallest cost is determined as a final prediction mode of a current prediction unit. When the costs are compared with each other, the final prediction mode to be applied to the current prediction unit may be determined based on rate-distortion.

In order for a decoding side to generate a prediction value of a prediction unit on which inter prediction is performed, reference picture information about a picture referred to for every prediction unit on which inter prediction is performed, motion vector information, and motion information such as a prediction direction may be transmitted to the decoding side. According to one or more exemplary embodiments, in order to reduce transmission overhead, the motion information is encoded based on motion information that is predicted by using motion information of an adjacent prediction unit that is previously encoded or by using a prediction unit collocated to a current prediction unit in the previous picture, rather than being encoded without changes.

According to one or more exemplary embodiments, there are provided various methods of additionally generating candidate motion information such that the total number of pieces of motion information is equal to a predetermined number when the number of pieces of default motion information obtained from a prediction unit that is spatially and temporally collocated to a current prediction unit that is previously determined by an encoding side and a decoding side is smaller than the predetermined number. According to one or more exemplary embodiments, the same method may be previously determined from among the various methods of additionally generating candidate motion information by the encoding side and the decoding side. In this case, respective predetermined indexes indicating the various methods of additionally generating candidate motion information may be set. In addition, an index indicating a method of additionally generating candidate motion information, which is used for encoding, may be added to a sequence parameter set (SPS), a picture parameter set (PPS), or a slice header and may be transmitted.

Throughout this specification, one or more exemplary embodiments will be described in terms of a case where motion vector information as motion information is encoded. However, exemplary embodiments are not limited thereto. Alternatively, one or more exemplary embodiments may be applied to a case where motion information other than motion vector information, such as reference picture information and prediction direction information is encoded.

Hereinafter, a method and apparatus for encoding motion information of a prediction unit, and a method and apparatus for decoding motion information of a prediction unit will be described in detail with regard to one or more exemplary embodiments.

Figure 14:
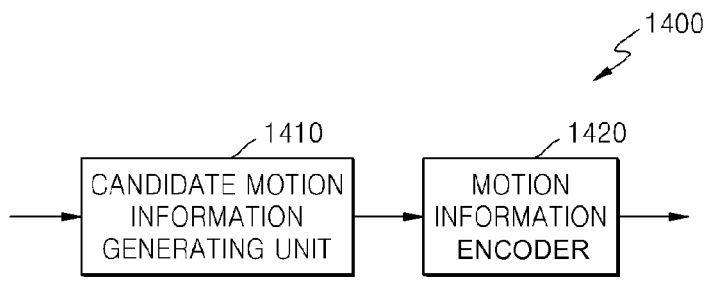
FIG. 14 is a block diagram of a motion information encoding apparatus according to an exemplary embodiment.

FIG. 14 is a block diagram of a motion information encoding apparatus 1400 according to an exemplary embodiment. Referring to FIG. 14, the motion information encoding apparatus 1400 includes a candidate motion information generating unit 1410, i.e. a candidate motion information generator, and a motion information encoder 1420. The motion information encoding apparatus 1400 of FIG. 14 may be included in the image encoder 400 of FIG. 4. For example, the motion estimator 420 of FIG. 4 may perform a function of the candidate motion information generating unit 1410 of FIG. 14 and the entropy encoder 450 of FIG. 4 may perform a function of the motion information encoder 1420 of FIG. 14. Exemplary embodiments are not limited thereto. Other components or a controller (not shown) of the image encoder 400 of FIG. 4 may perform a function of the motion information encoding apparatus 1400 of FIG. 14. The candidate motion information generating unit 1410 obtains candidate motion information by using motion information of adjacent prediction units that are temporally and spatially collocated to a current prediction unit. In particular, the candidate motion information generating unit 1410 obtains default candidate motion information from adjacent prediction units that are spatially collocated to the current prediction unit that is previously set and prediction units that are temporally collocated to the current prediction unit that is previously set. If the number of pieces of default candidate motion information is smaller than a predetermined number n (where n is an integer), i.e. a threshold, the candidate motion information generating unit 1410 generates 'n' pieces of candidate motion information by modifying or combining motion information of prediction units that are spatially collocated to the current prediction and motion information of prediction units that are temporally collocated to the current prediction or adding motion information having a predetermined value such that the total number of pieces of candidate motion information may be 'n'. A process of generating candidate motion information will be described later.

The motion information encoder 1420 determines motion information about the current prediction unit from among the 'n' pieces of candidate motion information and encodes index information indicating the determined motion information as motion information of the current prediction unit. In detail, the motion information encoder 1420 assigns 0 to (n−1) motion information indexes to the 'n' pieces of candidate motion information, respectively, and encodes an index corresponding to motion information of the current prediction unit as motion information of the current prediction unit. For example, when motion information corresponds to a prediction motion vector and n=2, that is, when the number of prediction motion vector candidates of the current prediction unit is fixed to 2, if two prediction motion vector candidates that are respectively generated with respect to a direction L0 and a direction L1 by the candidate motion information generating unit 1410 are MVLX_Cand0 and MVLX_Cand1 (X is 0 or 1), respectively, the motion information encoder 1420 sets a prediction motion vector index indicating MVLX_Cand0 to 0 and sets a prediction motion vector index indicating MVLX_Cand1 to 1 and encodes an index corresponding to a prediction motion vector having a minimum cost as motion vector information of the current prediction unit according to the encoding result of the current prediction unit.

The motion information encoder 1420 may encode reference picture information, prediction direction information, and a difference value between the prediction motion vector and an original motion vector of the current prediction unit, in addition to the prediction motion vector index, and may add the encoded information to a bitstream.

When the encoding side obtains a fixed number of pieces of candidate motion information under a predetermined rule and transmits index information indicating a single piece of motion information from among the pieces of candidate motion information, the decoding side may generate a fixed number of pieces of candidate motion information under the same rule as that of the encoding side and may determine motion information of the current prediction unit by using the transmitted index information. Like in the above-described example, when the motion information corresponds to a prediction motion vector, the decoding side may obtain an index indicating the prediction motion vector and a difference value between a motion vector and the prediction motion vector from a bitstream and may restore the motion vector of the current prediction unit by adding the difference value with the prediction motion vector indicated by the prediction motion vector index. In addition, the decoding side may generate a prediction value of the current prediction unit by using the restored motion vector, and the reference picture information and the prediction direction information (directions L0 and L1) which are obtained from a bitstream.

Figure 15:
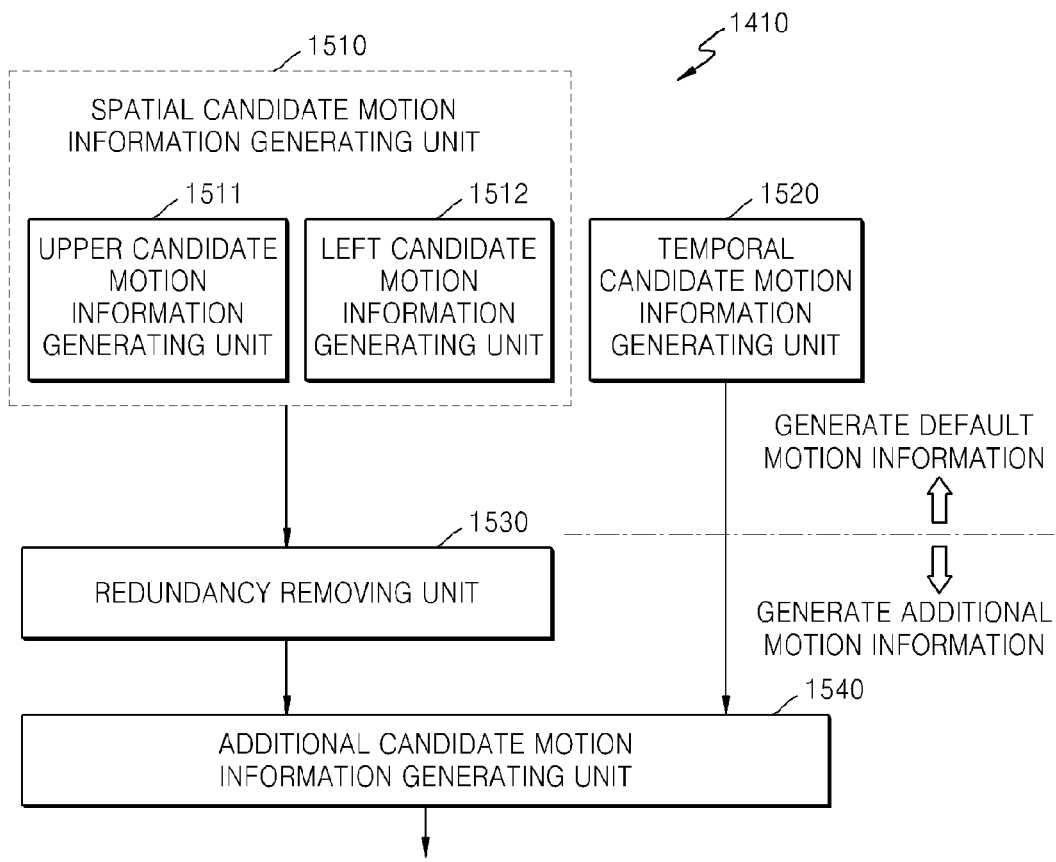
FIG. 15 is a block diagram of a candidate motion information generating unit of FIG. 14, according to an exemplary embodiment.

FIG. 15 is a block diagram of the candidate motion information generating unit 1410 of FIG. 14, according to an exemplary embodiment.

Referring to FIG. 15, the candidate motion information generating unit 1410 includes a spatial candidate motion information generating unit 1510, a temporal candidate motion information generating unit 1520, a redundancy removing unit 1530, and an additional candidate motion information generating unit 1540.

The spatial candidate motion information generating unit 1510 generates candidate motion information by using motion information of prediction units that are spatially collocated to the current prediction unit. In detail, the spatial candidate motion information generating unit 1510 includes an upper candidate motion information generating unit 1511 that sequentially searches adjacent prediction units positioned above the current prediction unit in a predetermined order to obtain motion information, and a left candidate motion information generating unit 1512 that sequentially searches adjacent prediction units positioned on the left of the current prediction unit in a predetermined order to obtain motion information.

Figure 16:
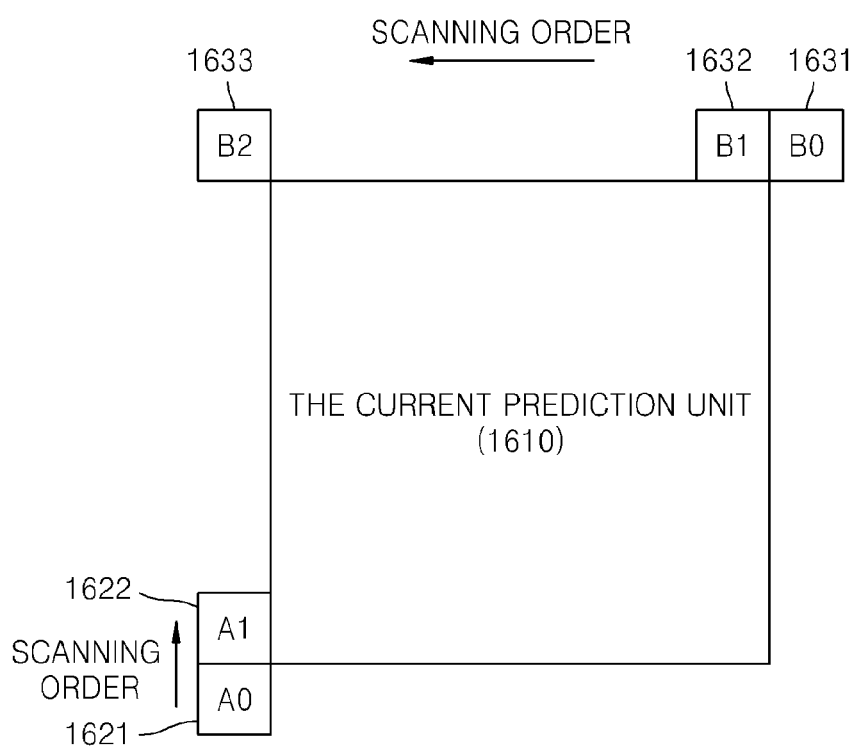
FIG. 16 illustrates adjacent prediction units that are spatially collocated to a current prediction unit, according to an exemplary embodiment.

FIG. 16 illustrates adjacent prediction units that are spatially collocated to a current prediction unit, according to an exemplary embodiment. Exemplary embodiments are not limited to the case shown in FIG. 16. For example, adjacent prediction units of different spatial locations may be used as adjacent prediction units that are spatially collocated to a current prediction unit used to predict motion information of a current prediction unit.

Referring to FIG. 16, the spatial candidate motion information generating unit 1510 searches a left-bottom adjacent prediction unit A0 1621 positioned on the left-bottom of the current prediction unit 1610 and a left-down adjacent prediction unit A1 1622 positioned above the left-bottom adjacent prediction unit A0 1621 from among adjacent prediction units positioned on the left of a current prediction unit 1610 in a predetermined scanning order, and determines motion information of a first prediction unit having available motion information, which is first searched, as left candidate motion information, from among the left-bottom adjacent prediction unit A0 1621 and the left-down adjacent prediction unit A1 1622. In addition, the spatial candidate motion information generating unit 1510 searches an adjacent prediction unit B0 1631 positioned on the above-right of the current prediction unit 1610, an adjacent prediction unit B1 1632 positioned on the left of the adjacent prediction unit B0 1631, and an adjacent prediction unit B2 1633 positioned on the above-left of the current prediction unit 1610 from among adjacent prediction units positioned above the current prediction unit 1610, and determines motion information of a prediction unit having available motion information, which is first searched, as upper candidate motion information. Likewise, the spatial candidate motion information generating unit 1510 does not search all prediction units positioned around the current prediction unit 1610 and searches default adjacent prediction units, that is, the adjacent predictions units A0, A1, B0, B1, and B2 to obtain motion information, thereby reducing calculation complexity. As described above, the number and locations of adjacent prediction units that are searched to obtain spatial candidate motion information may be changed. However, in order for a decoding side to restore motion information of the current prediction unit, the number and locations of adjacent prediction units that are searched to obtain spatial candidate motion information in an encoding side and the decoding side may be previously set.

As an example of a process for determining motion information, a process for determining a prediction motion vector of a motion vector of a current prediction unit from adjacent prediction units that are spatially collocated to the current prediction unit will be described.

Referring to FIGS. 15 and 16, the left candidate motion information generating unit 1512 sequentially checks whether motion vectors of the left-bottom adjacent prediction unit A0 1621 and the left-down adjacent prediction unit A1 1622 are available and determines a motion vector of an adjacent prediction unit having an available motion vector as a left candidate motion vector. Here, the availability of a motion vector refers to whether an adjacent prediction unit has a motion vector indicating the same reference picture in the same reference picture list as a current prediction unit. For example, when a motion vector of the current prediction unit 1610 is a motion vector indicating a reference picture (L0R0 picture) having a reference index R0 in a list L0, if the left-bottom adjacent prediction unit A0 1621 is a prediction unit on which intra prediction is performed, or has a motion vector indicating a reference picture included in a different reference picture list from the current prediction unit 1610, or has a motion vector indicating a different reference picture included in the same reference picture as the current prediction unit 1610, it is determined that the left-bottom adjacent prediction unit A0 1621 does not have an available motion vector. If the left-down adjacent prediction unit A1 1622 has a motion vector indicating the same picture in the same reference picture list as the current prediction unit 1610, the motion vector of the left-down adjacent prediction unit A1 1622 is determined as a left candidate motion vector.

Similarly, the upper candidate motion information generating unit 1511 sequentially checks whether motion vectors of the adjacent prediction unit B0 1631, the adjacent prediction unit B1 1632, and the adjacent prediction unit B2 1633 are available and determines a motion vector of an adjacent prediction unit indicating the same reference picture in the same reference picture list as the current prediction unit 1610 as an upper candidate motion vector.

When adjacent prediction units having an available motion vector do not exist from among adjacent prediction units, the spatial candidate motion information generating unit 1510 may scale a motion vector of an adjacent prediction unit indicating a different reference picture of the same reference picture list as the current prediction unit 1610 or a motion vector of an adjacent prediction unit indicating a reference picture included in a different reference picture list from the current prediction unit 1610 and may use the scaled motion vector as a prediction motion vector candidate of the current prediction unit 1610.

Figure 17A:
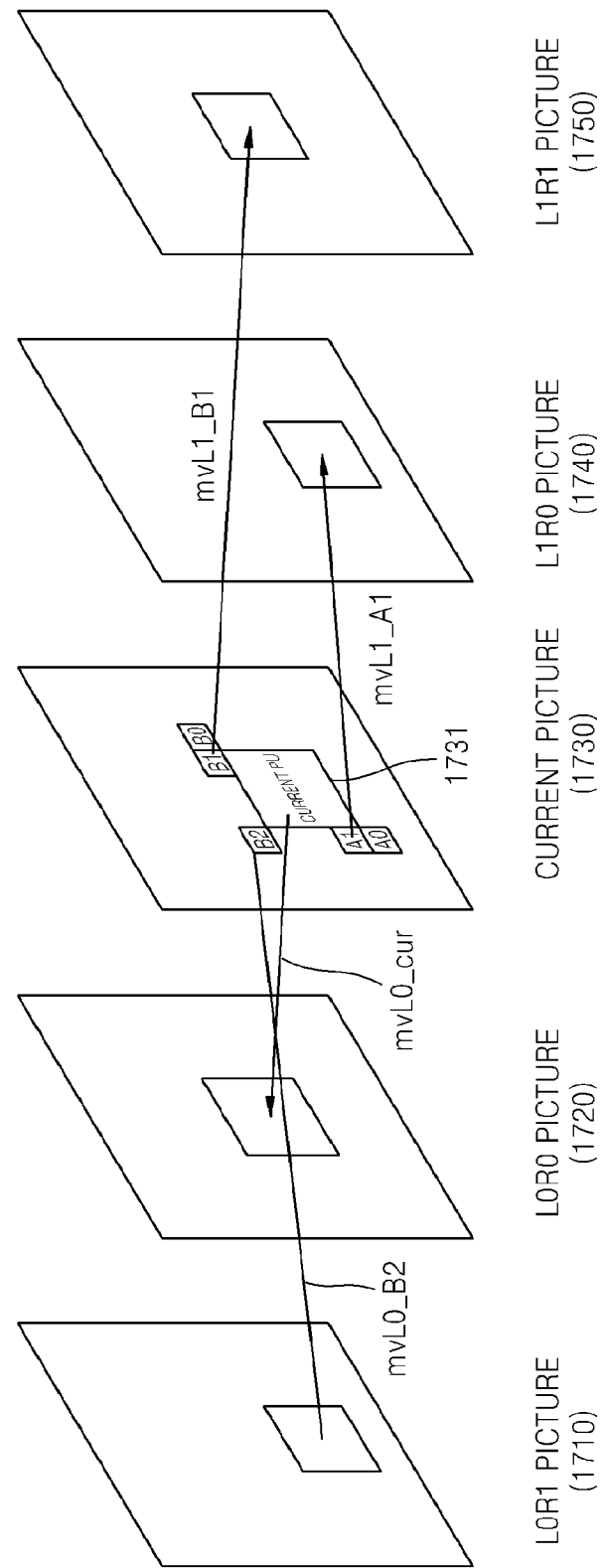
FIG. 17A is a reference diagram for explaining a process for determining a scaled spatial prediction motion vector candidate, according to an exemplary embodiment.

FIG. 17A is a reference diagram for explaining a process for determining a scaled spatial prediction motion vector candidate, according to an exemplary embodiment.

Referring to FIG. 17A, a motion vector MVL0_Cur of a current prediction unit 1731 indicates an L0R0 picture 1720 that is a reference picture having a reference index R0 in a list L0, the left-bottom adjacent prediction unit A0 1621 has a prediction motion on which intra prediction is performed, the left-down adjacent prediction unit A1 1622 has a motion vector mvL1_A1 indicating an L1R0 picture 1740 that is a reference picture having a reference index R0 in a list L1, the adjacent prediction unit B0 1631 has a prediction unit on which intra prediction is performed, the adjacent prediction unit B1 1632 has a motion vector mv1_B1 indicating an L1R1 picture 1750 that is a reference picture having a reference index R1 in a list L1, and adjacent prediction unit B2 1633 has a motion vector mvL0_B2 indicating an L0 R1 picture 1710 that is a reference picture having a reference index R1 in a list L0. In FIG. 17A, any prediction unit from among adjacent prediction units of the current prediction unit 1731 does not have the same motion vector indicating the L0 R0 picture 1720 as the motion vector MVL0_Cur of the current prediction unit 1731. When an adjacent prediction unit having a motion vector indicating the same reference picture as a reference picture indicated by a motion vector of the current prediction unit 1731 does not exist from among adjacent prediction units, the spatial candidate motion information generating unit 1510 may scale a motion vector of a prediction unit on which inter prediction is performed, from among adjacent prediction units, based on a temporal distance between a reference picture indicated by a motion vector of a prediction unit on which inter prediction is performed and a reference picture indicated by a motion vector of a current prediction unit and may add the scaled motion vector to a candidate motion vector. That is, the spatial candidate motion information generating unit 1510 may add a motion vector of an adjacent prediction unit indicating a reference picture having a different reference index in the same reference picture list as the current prediction unit 1731 from among motion vectors of an adjacent prediction unit to a candidate motion vector. In addition, when a motion vector of an adjacent prediction unit indicating a reference picture having a different reference index in the same reference picture list as the current prediction unit 1731 does not exist from among motion vectors of an adjacent prediction unit, the spatial candidate motion information generating unit 1510 may add a motion vector of an adjacent prediction unit indicating a reference picture in a different reference picture list from the current prediction unit 1731 to the candidate motion vector.

For example, the spatial candidate motion information generating unit 1510 may scale the motion vector mvL1_A1 of the left-down adjacent prediction unit A1 1622, except for the left-bottom adjacent prediction unit A0 1621 on which intra prediction is performed, in consideration of a temporal distance between a current picture 1730 and the L0R0 picture 1720 indicated by the motion vector MVL0_Cur of the current prediction unit 1731 and a temporal distance between the current picture 1730 and the L1R0 picture 1740 indicated by the motion vector mvL1_A1 of the left-down adjacent prediction unit A1 1622 and may determine the scaled motion vector mvL1_A1' (not shown) as a left motion vector candidate.

In addition, the spatial candidate motion information generating unit 1510 may scale the motion vector mvL0_B2 of the adjacent prediction unit B2 1633 indicating the L0R1 picture 1710 that is a reference picture having a different reference index in the same reference picture as the motion vector MVL0_Cur of the current prediction unit 1731, instead of the motion vector mv1_B1 of the adjacent prediction unit B1 1632 indicating the L1R1 picture 1750 that is a reference picture in a different reference picture list from the current prediction unit 1731 and determines the scaled motion vector mvL0_B2' (not shown) as an upper motion vector candidate. That is, when the spatial candidate motion information generating unit 1510 determines a motion vector of an adjacent prediction unit, which is subject to scaling, the spatial candidate motion information generating unit 1510 may determine a motion vector of an adjacent prediction unit indicating a reference picture included in the same reference picture list as a motion vector of a current prediction unit. Then, when a motion vector of an adjacent prediction unit indicating a reference picture included in the same reference picture list as the current prediction unit does not exist, the spatial candidate motion information generating unit 1510 may determine a motion vector of an adjacent prediction unit indicating a reference picture included in a different reference picture list from the current prediction unit as a motion vector that is subject to scaling. The spatial candidate motion information generating unit 1510 may scale the motion vector mvL0_B2 of the adjacent prediction unit B2 in consideration of a temporal distance between the current picture 1730 and the L0R0 picture 1720 indicated by the motion vector MVL0_Cur of the current prediction unit 1731 and a temporal distance between the current picture 1730 and the L0R1 picture 1710 indicated by the motion vector mvL0_B2 of the adjacent prediction unit B2 1633 and may determine the scaled motion vector mvL0_B2' as an upper motion vector candidate.

Figure 18:
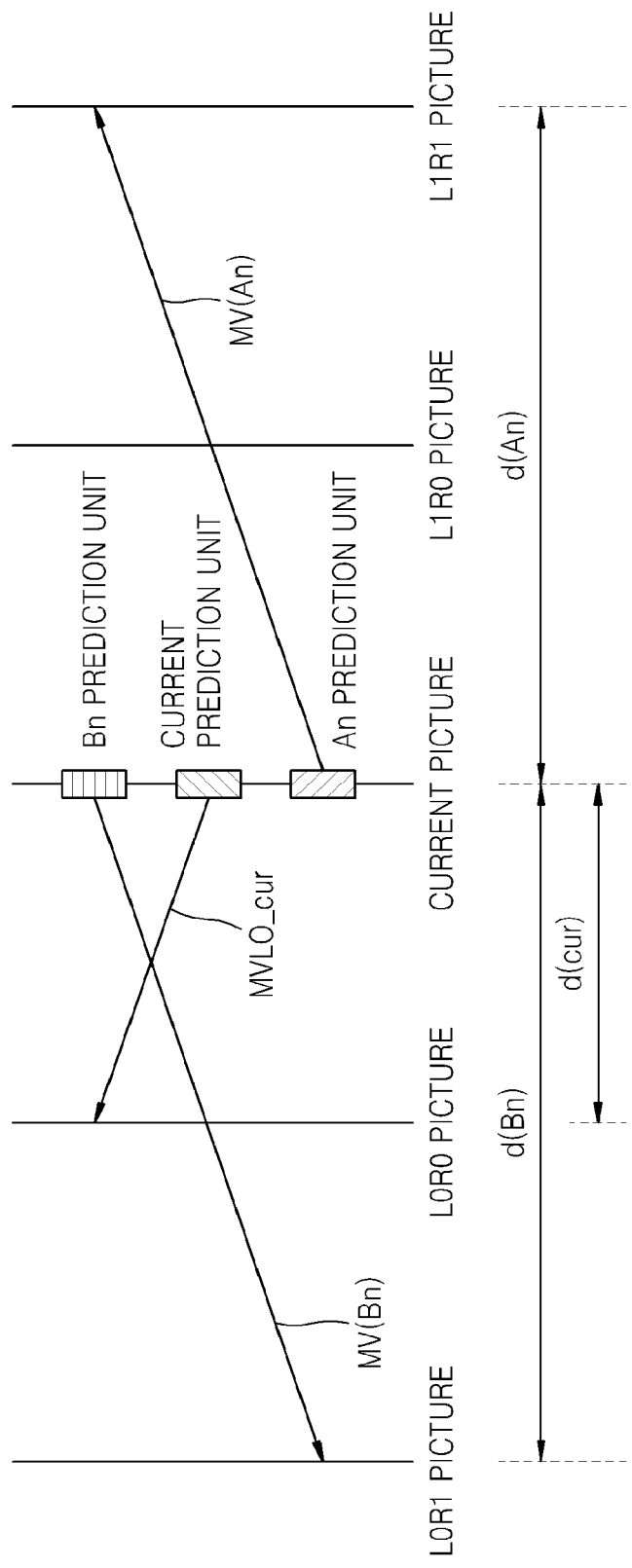
FIG. 18 is a reference diagram for explaining a method of generating a prediction motion vector candidate of a current prediction unit by scaling a motion vector of an adjacent prediction unit, according to an exemplary embodiment.

FIG. 18 is a reference diagram for explaining a method of generating a prediction motion vector candidate of a current prediction unit by scaling a motion vector of an adjacent prediction unit, according to an exemplary embodiment.

As described above, when the same motion vector as a current prediction unit, that is, a motion vector indicating a reference picture having the same reference index included in the same reference picture list as the current prediction unit does not exist from among adjacent prediction units of the current prediction unit, a motion vector MV(Bn) of an adjacent prediction unit (a prediction unit Bn of FIG. 18) referring to a different reference picture in the same reference picture list as the current prediction unit or a motion vector MV(An) of an adjacent prediction unit (a prediction unit An of FIG. 18) referring to a reference picture included in a different reference picture list from the current prediction unit may be scaled, and the scaled motion vector may be added to a prediction motion vector candidate of the current prediction unit. In detail, when a temporal distance d(cur) between a current picture and a reference picture (an L0R0 picture) indicated by the motion vector MVL0_Cur of a current prediction unit is d(cur) and a temporal distance between the current picture and a reference picture (an L0R1 picture) indicated by the motion vector MV(Bn) of a prediction unit Bn is d(Bn), the motion vector MV(Bn) of the prediction unit Bn may be scaled according to Equation, MV(Bn)'=MV(Bn)*{d(cur)/d(Bn)}, and the scaled motion vector MV(Bn)' may be added to a prediction motion vector candidate of the current prediction unit. Similarly, when a temporal distance between a current picture and a reference picture (a L1R1 picture) indicated by a motion vector MV(An) of a prediction unit An is d(An), the motion vector MV(An) of the prediction unit An may be scaled according to Equation, MV(An)'=MV(An)*{d(cur)/d(An)}, and the scaled motion vector MV(An)' may be added to a prediction motion vector candidate of the current prediction unit.

Whether the scaled motion vector is included in a spatial motion vector candidate may be determined in consideration of a predetermined condition. For example, the spatial candidate motion information generating unit 1510 may scale a motion vector of a prediction unit on which inter prediction is performed, from among the adjacent prediction units B0, B1, and B2 and may add the scaled motion vector to an upper motion vector candidate only when intra prediction is performed on one of the adjacent prediction units A0 and A1 adjacent to the left of the current prediction unit. In other words, whether the scaled motion vector is added to a spatial prediction motion vector candidate may be selectively performed according to whether a predetermined condition is satisfied. The predetermined condition may be designed in various ways and is not limited to the above-described example.

In the above-described example, when the spatial candidate motion information generating unit 1510 searches upper prediction units and left prediction units that are spatially collocated to a current prediction unit, the spatial candidate motion information generating unit 1510 searches left adjacent prediction units in order of A0->A1 or searches upper adjacent prediction units in order of B0->B1->B2. However, exemplary embodiments are not limited to the scanning order. Alternatively, the spatial candidate motion information generating unit 1510 may determine adjacent prediction units in order of, for example, A1->B1->B0->A0->B2 without a basis such as an upper or left side and may determine whether motion information of each adjacent prediction unit is used as motion information of the current prediction unit.

In addition, when the spatial candidate motion information generating unit 1510 generates spatial candidate motion information, the spatial candidate motion information generating unit 1510 may check whether motion information of all prediction units positioned above the current prediction unit and on the left of the current prediction unit, for example, of all of the adjacent predictions units A0, A1, B0, B1, and B2 is available without any scanning order instead of searching adjacent prediction units in a predetermined scanning order and then may add all pieces of available motion information from among the motion information of the adjacent predictions units A0, A1, B0, B1, and B2 to the spatial motion information candidate.

Referring back to FIG. 15, the temporal candidate motion information generating unit 1520 generates temporal candidate motion information by using motion information of a motion unit that is temporally collocated to a current prediction unit, that is, motion information of a motion unit that is collocated based on a location of the current prediction unit from among prediction units of a previous picture that is previously encoded.

FIG. 19 is a reference diagram for explaining a process of generating temporal candidate motion information, according to an exemplary embodiment.

Referring to FIGS. 15 and 19, the temporal candidate motion information generating unit 1520 may generate temporal candidate motion information by using motion information of a prediction unit 1924 positioned on the below-right of a prediction unit 1921 of the reference picture 1920 having the same location as a current prediction unit 1911 from among prediction units of a reference picture 1920 that is previously encoded to a current picture 1910. For example, when motion information is a prediction motion vector, the temporal candidate motion information generating unit 1520 may generate a temporal motion vector candidate by scaling a motion vector of the prediction unit 1924. The scaling of the temporal prediction motion vector may be performed based on a temporal distance between an L0R0 picture 1920 and a reference picture L1R0 1930 and a temporal distance between the current picture 1910 and the reference picture L1R0 1930, as described with reference to FIG. 18.

If the prediction unit 1924 positioned on the below-right of the prediction unit 1921 is intra-predicted such that a motion vector of the prediction unit 1924 is not available, the temporal candidate motion information generating unit 1520 may scale a motion vector of the prediction unit 1921, which contains a point C' 1922 of the reference picture 1920 as the same location as a point C 1912 of a central point of the current prediction unit 1911 and may generate the temporal prediction motion vector. That is, the temporal candidate motion information generating unit 1520 may first check whether motion information of a prediction unit positioned on the below-right of a prediction unit having the same location as a current prediction unit from among prediction units of a previous picture is available, may sequentially determine whether motion information of a prediction unit containing a point having the same location as a central point of the current prediction unit is available, and then may add available motion information of a prediction unit to the temporal candidate motion information. The number and locations of prediction units of a previous picture that is searched to generate the temporal candidate motion information may not be limited to the case shown in FIG. 19 and may be changed in various ways. In addition, when the temporal candidate motion information generating unit 1520 generates temporal candidate motion information, the temporal candidate motion information generating unit 1520 may not check whether motion information of prediction units of a previous picture is available in a predetermined order, may check both whether motion information of a prediction unit positioned on the below-right of a prediction unit having the same location as a current prediction unit is available and whether motion information of a prediction unit containing a point having the same location as a central point of the current prediction unit is available, and then may add all of pieces of the available motion information of the prediction unit of the previous picture to the temporal candidate motion information.

Referring back to FIG. 15, the redundancy removing unit 1530 may determine whether the spatial candidate motion information and the temporal candidate motion information are identical to each other and may remove redundant motion information from the candidate motion information. The redundancy removing unit 1530 may be omitted in order to reduce calculation complexity. That is, a process of checking redundancy may be skipped.

The number of pieces of the candidate motion information generated by the spatial candidate motion information generating unit 1510 and the temporal candidate motion information generating unit 1520 may be smaller than a predetermined number 'n'. In the above-described example, when intra prediction is performed on all adjacent prediction units positioned above the current prediction unit or on the left of the current prediction unit or when intra prediction is performed on prediction units positioned in a predetermined location of previous pictures searched by the temporal candidate motion information generating unit 1520, the number of pieces of the generated candidate motion information may be less than 'n'.

When the number of pieces of the generated candidate motion information generated by the spatial candidate motion information generating unit 1510 and the temporal candidate motion information generating unit 1520 is less than a predetermined number 'n', the additional candidate motion information generating unit 1540 may generate additional candidate motion information by using motion information of spatial prediction units and available motion information of temporal prediction units such that the total number of pieces of candidate motion information may be 'n'.

Hereinafter various methods of generating additional candidate motion information via the additional candidate motion information generating unit 1540 will be described.

When the spatial candidate motion information generating unit 1510 sequentially checks whether adjacent prediction units of a current prediction unit are available, the additional candidate motion information generating unit 1540 may generate additional candidate motion information by using motion information of a prediction unit that is checked after an available adjacent prediction unit that is first checked.

Figure 17B:
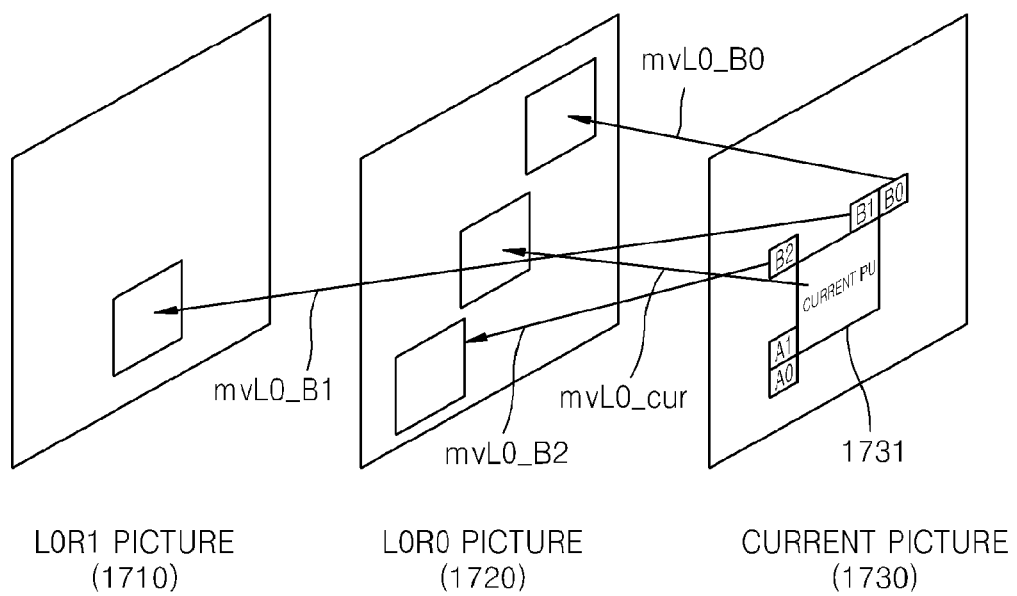
FIG. 17B is a reference diagram for explaining a process for generating additional candidate motion information by using a prediction unit that is spatially collocated to a current prediction unit, according to an exemplary embodiment.

FIG. 17B is a reference diagram for explaining a process for generating additional candidate motion information by using a prediction unit that is spatially collocated to a current prediction unit, according to an exemplary embodiment.

Referring to FIG. 17B, the additional candidate motion information generating unit 1540 may generate motion information of a prediction unit from the adjacent prediction units A0, A1, B0, B1 and B2, which have available motion information but are not included in candidate motion information because of being checked after another prediction unit that is previously scanned in a scanning order, as additional candidate motion information.

For example, it is assumed that left candidate motion information generated by the spatial candidate motion information generating unit 1510 is 'Left', upper candidate motion information generated by the spatial candidate motion information generating unit 1510 is 'Above', and temporal candidate motion information generated by the temporal candidate motion information generating unit 1520 is 'Temporal'. The additional candidate motion information generating unit 1540 determines whether the candidate motion information (that is, Left, Above, and Temporal) is available, that is, whether the candidate motion information exists and determines that the number of pieces of the candidate motion information is a predetermined number 3 (which corresponds to n=3). In addition, when the number of pieces of candidate motion information is less than a predetermined number, the additional candidate motion information generating unit 1540 may generate additional candidate motion information by using motion information of a prediction unit that is checked after an available adjacent prediction unit that is previously checked.

As described above, when the spatial candidate motion information generating unit 1510 generates spatial candidate motion information, the spatial candidate motion information generating unit 1510 may check whether motion information of all prediction units positioned above the current prediction unit and on the left of the current prediction unit, for example, of all of the adjacent predictions units A0, A1, B0, B1, and B2 is available without any scanning order and then may add all pieces of available motion information from among the motion information of the adjacent predictions units A0, A1, B0, B1, and B2 to the spatial motion information candidate. In this case, when the number of pieces of candidate motion information is less than a predetermined number, for example, 5, the additional candidate motion information generating unit 1540 may generate additional candidate motion information by using motion information of the available prediction unit.

It is assumed that left candidate motion information does not exist and motion information of the adjacent prediction units B0, B1, and B2 is available. As shown in FIG. 17B, motion information of the adjacent prediction unit B0 that is previously checked in a scanning order is selected as upper candidate motion information and motion information of the adjacent prediction units B1 and B2 is not included in default motion information. When the total number of pieces of candidate motion information is less than a predetermined number since the adjacent prediction units A0 and A1 do not have available motion information, the additional candidate motion information generating unit 1540 may add motion information of the adjacent prediction unit B1 or B2 to additional candidate motion information.

Similarly, when upper candidate motion information does not exist and motion information of the left adjacent prediction units A0 and A1 is available, motion information of the adjacent prediction unit A0 that is previously checked is selected as left motion information and motion information of the adjacent prediction unit A1 that is checked after the adjacent prediction unit A1 is not included in default motion information. However, when the number of pieces of candidate motion information is less than a predetermined number since the adjacent prediction units B0, B1, and B2 do not have available motion information, motion information of the adjacent prediction unit A1 may be included in additional candidate motion information.

According to another exemplary embodiment, when the temporal candidate motion information generating unit 1520 sequentially checks whether prediction units of a previous picture that is temporally collocated to a current prediction unit are available, the additional candidate motion information generating unit 1540 may scale motion information of a prediction unit of a previous picture having motion information from among prediction units of the remaining previous picture except for a first previous picture having available motion information and may add the scaled motion information to additional candidate motion information.

Referring back to FIG. 19, the temporal candidate motion information generating unit 1520 checks whether motion information of the prediction unit 1924 positioned on the right-bottom of the prediction unit 1921 of the reference picture 1920 having a corresponding location to the current prediction unit 1911 is available from among prediction units of the reference picture 1920 that is previously encoded to the current picture 1910 and then determines whether motion information of the prediction unit 1921, which contains a point C' 1922 of the reference picture 1920 as the same location as a point C 1912 of a central point of the current prediction unit 1911, is available. If the prediction unit 1924 positioned on the right-bottom of the prediction unit 1921 has available motion information, motion information of the prediction unit 1924 positioned on the right-bottom of the prediction unit 1921 is included in default candidate motion information and motion information of the prediction unit 1921, which contains the point C' 1922 of the reference picture 1920 as the same location as the point C 1912 is not included in default candidate motion information. When the total number of pieces of candidate motion information is less than a predetermined number, the additional candidate motion information generating unit 1540 may add motion information of the prediction unit 1921, which contains the point C' 1922 of the reference picture 1920 as the same location as the point C 1912 to additional candidate motion information. That is, the additional candidate motion information generating unit 1540 may add motion information of a prediction unit that is not included in default candidate motion information from among prediction units of a previous picture to additional candidate motion information.

According to another exemplary embodiment, the additional candidate motion information generating unit 1540 may add motion information having a predetermined value to additional candidate motion information. For example, when motion information is a prediction motion vector, if the number of pieces of candidate motion information is less than a predetermined number, the additional candidate motion information generating unit 1540 may add a motion vector having a predetermined component value such as (0,0), (0,1), or (1,0) to a candidate motion vector.

According to another exemplary embodiment, when available motion information of spatial prediction units and temporal prediction units contains bi-directional motion vector information of prediction units of the directions L0 and L1, the additional candidate motion information generating unit 1540 may add or subtract a predetermined offset to and from a motion vector of the prediction unit of the direction L0 and a motion vector of the prediction unit of the direction L1 to generate additional candidate motion information.

Figure 20A:
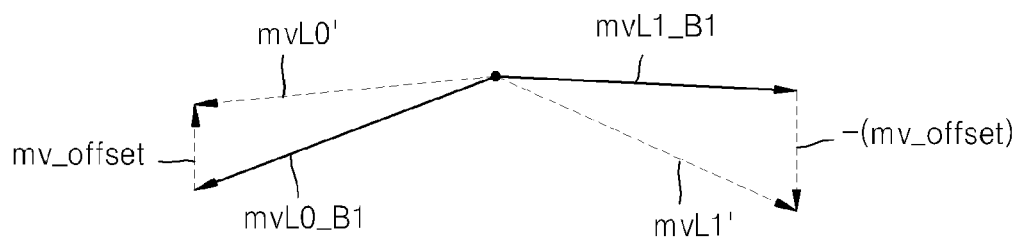
FIGS. 20A and 20B are diagrams for explaining a process of generating additional candidate motion information by using motion information of available prediction units, according to another exemplary embodiment.
Figure 20B:
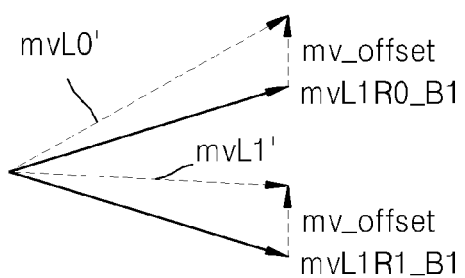
Figure 21A:
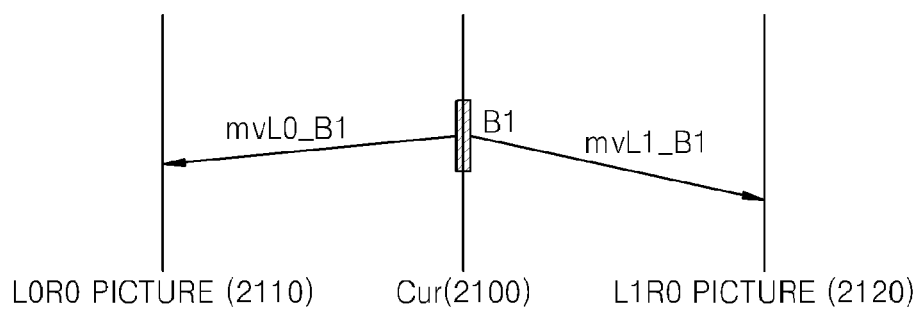
FIGS. 21A and 21B are diagrams for describing a positional relationship between a current picture and a reference picture when additional candidate motion information of FIGS. 20A and 20B is generated, according to an exemplary embodiment.
Figure 21B:
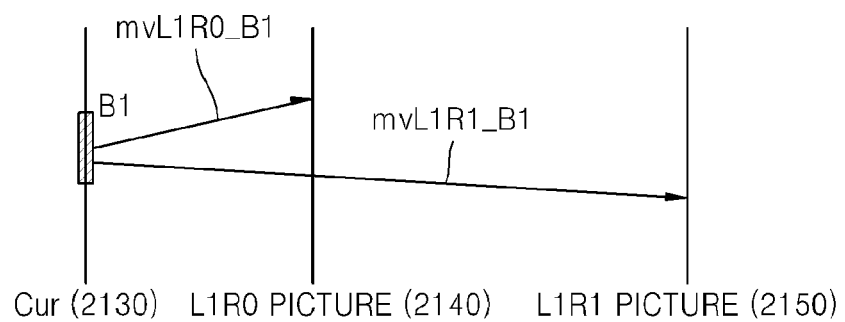

FIGS. 20A and 20B are diagrams for explaining a process of generating additional candidate motion information by using motion information of available prediction units, according to another exemplary embodiment. FIGS. 21A and 21B are diagrams for describing a positional relationship between a current picture and a reference picture when additional candidate motion information of FIGS. 20A and 20B is generated, according to an exemplary embodiment.

Referring to FIGS. 20A and 21A, when the adjacent prediction unit B1 from among prediction units positioned above a current prediction unit has a motion vector mvL0_B1 indicating an L0R0 picture 2110 that is a reference picture of the prediction of the direction L0 and a motion vector mvL1_B1 indicating a L1R0 picture 2120 that is a reference picture of the prediction of the direction L1, and a current picture 2100 is positioned between the L0R0 picture 2110 and the L1R0 picture 2120, the additional candidate motion information generating unit 1540 may add predetermined offsets having the same absolute value and different signs to the motion vector mvL0_B1 of the prediction of the direction L0 and the motion vector mvL1_B1 of the prediction of the direction L1 to generate a new motion vector and may add the new motion vector to additional candidate motion information. That is, as shown in FIG. 20A, the additional candidate motion information generating unit 1540 may add a predetermined offset mv_offset to the motion vector mvL0_B1 of the prediction of the direction L0 such that a generated motion vector mvL0' may be included in an additional candidate motion vector of the prediction of the direction L0 and may subtract the offset mv_offset from the motion vector mvL1_B1 of the prediction of the direction L1 such that generated motion vector mvL1' may be included in additional candidate motion vector of the prediction of the direction L1.

When a motion vector List0MV of the direction L0, which is included in bi-directional motion information obtained from an available adjacent prediction unit, has a value (mx0, my0) and a motion vector List1MV of the direction L1 has a value (mx1, my1), if a current picture is positioned between a reference picture of the prediction of the direction L1 and a reference picture of the prediction of the direction L0, the additional candidate motion information generating unit 1540 may add and subtract a predetermined offset to and from a motion vector of the prediction of the direction L0 and a motion vector of the prediction of the direction L1 to generate additional candidate motion information as follows.

List0MV=(mx0+offset, my0),List1MV=(mx0−offset, my0);

List0MV=(mx0−offset, my0),List1MV=(mx0+offset, my0);

List0MV=(mx0, my0+offset),List1MV=(mx0, my0−offset);

List0MV=(mx0, my0−offset),List1MV=(mx0, my0+offset);

List0MV=(mx0+offset, my0+offset),List1MV=(mx0−offset, my0−offset);

List0MV=(mx0+offset, my0−offset),List1MV=(mx0−offset, my0+offset);

List0MV=(mx0−offset, my0+offset),List1MV=(mx0+offset, my0−offset); and

List0MV=(mx0−offset, my0−offset),List1MV=(mx0+offset, my0+offset)

Referring to FIGS. 20B and 21B, when the adjacent prediction unit B1 from among prediction units positioned above a current prediction unit has a motion vector mvL1R0_B1 indicating an L1R0 picture 2140 that is a reference picture of the direction L0 and a motion vector mvL1R1_B1 indicating an L1R1 picture 2150 that is a reference picture of the direction L1, if the L1R0 picture 2140 and the L1R1 picture 2150 are positioned on same locations with respect to a current picture 2130, the additional candidate motion information generating unit 1540 may add or subtract a predetermined offset to and from a motion vector mvL1R0_B1 of the prediction of the direction L0 and a motion vector mvL1R1_B1 of the prediction of the direction L1 to generate a new motion vector and may add the generated new motion vector to additional candidate motion information. That is, as shown in FIG. 20B, the additional candidate motion information generating unit 1540 may add a motion vector mvL0' generated by adding an offset mv_offset to the motion vector mvL1R0_B1 of the prediction of the direction L0 to an additional candidate motion vector of the prediction of the direction L0 and may add the motion vector mvL1' generated by adding the offset mv_offset to the motion vector mvL1R1_B1 of the prediction of the direction L1 to an additional candidate motion vector of the direction L1.

When a motion vector List0MV of the direction L0, which is obtained from an available adjacent prediction unit, has a value (mx0, my0), a motion vector List1MV of the direction L1 has a value (mx1, my1), and a reference picture of the direction L1 and a reference picture of the direction L0 are positioned on corresponding locations with respect to a current picture, the additional candidate motion information generating unit 1540 may add and subtract a predetermined offset to and from a motion vector of the prediction of the direction L0 and a motion vector of the prediction of the direction L1 to generate additional candidate motion information as follows.

List0MV=(mx0+offset, my0),List1MV=(mx0+offset, my0);

List0MV=(mx0−offset, my0),List1MV=(mx0−offset, my0);

List0MV=(mx0, my0+offset),List1MV=(mx0, my0+offset);

List0MV=(mx0, my0−offset),List1MV=(mx0, my0−offset);

List0MV=(mx0+offset, my0+offset),List1MV=(mx0+offset, my0+offset);

List0MV=(mx0+offset, my0−offset),List1MV=(mx0+offset, my0−offset);

List0MV=(mx0−offset, my0+offset),List1MV=(mx0−offset, my0+offset); and

List0MV=(mx0−offset, my0−offset),List1MV=(mx0−offset, my0−offset)

According to another exemplary embodiment, the additional candidate motion information generating unit 1540 may change available motion information of spatial prediction units and temporal prediction units to generate additional candidate motion information. When available motion information of spatial prediction units and temporal prediction units includes bi-directional motion vector information of the directions L0 and L1, the additional candidate motion information generating unit 1540 may add uni-directional information, which is generated by splitting the prediction of the directions L0 and L1, to additional candidate motion information. For example, it is assumed that bi-directional motion information obtained from available spatial prediction units and temporal prediction units includes motion information of the direction L0, which includes a motion vector List0MV of the direction L0 and a reference picture index List0REF indicating a reference picture of the direction L0, and motion information of the direction L1, which includes a motion vector List1MV of the direction L1 and a reference picture index List1REF indicating a reference picture of the direction L1. The additional candidate motion information generating unit 1540 may divide the bi-directional motion information to generate two pieces of uni-directional motion information and add the two pieces of uni-directional motion information to additional candidate motion information. That is, the additional candidate motion information generating unit 1540 may divide the bi-directional motion information into uni-directional motion information of the direction L0 including {a motion vector List0MV of the direction L0 and a reference picture index List0REF indicating a reference picture of the direction L0} and uni-directional motion information of the direction L1 including {a motion vector List1MV of the direction L1 and a reference picture index List1REF indicating a reference picture of the direction L1} and may add the uni-directional motion information to additional candidate motion information.

In addition, when available motion information of spatial prediction units and temporal prediction units includes uni-directional motion information of the direction L0 and uni-directional motion information of the direction L1, the additional candidate motion information generating unit 1540 may add bi-directional motion information generated by combining the uni-directional motion information of the directions L0 and L1 to additional candidate motion information. For example, when uni-directional motion information of the direction L0, {which includes a motion vector List0MV of the direction L0 and a reference picture index List0REF indicating a reference picture of the direction L0}, and uni-directional motion information of the direction L1, {which includes a motion vector List1MV of the direction L1 and a reference picture index List1REF indicating a reference picture of the direction L1} exist as motion information obtained from prediction units that are spatially and temporally collocated to a current prediction unit, the uni-directional motion information of the direction L0 and the uni-directional motion information of the direction L1 are combined to generate bi-directional motion information and the generated bi-directional motion information may be added to additional candidate motion information.

In addition, the additional candidate motion information generating unit 1540 may add a motion vector having a predetermined value and a reference index to any one of the uni-directional motion information of the direction L0 and the uni-directional motion information of the direction L1 to generate uni-directional motion information of different directions such that the obtained bi-directional motion information to additional candidate motion information. For example, when only uni-directional motion information of the direction L0, {which includes a motion vector List0MV of the direction L0 and a reference picture index List0REF indicating a reference picture of the direction L0}, exists as motion information obtained from prediction units that are spatially and temporally collocated to a current prediction unit, the additional candidate motion information generating unit 1540 may set a motion vector having a predetermined value such as (0,0) as a motion vector List1MV of the direction L1 and may set a reference picture index List1REF indicating a reference picture of the direction L1 as a predetermined value 0 to generate motion information of the direction L1, and may combine the generated motion information of the direction L1 and the existing motion information of the direction L0 such that the generated bi-directional motion information is included in additional candidate motion information.

The additional candidate motion information generating unit 1540 may generate only motion vector information from among motion information of an available prediction unit by using an available prediction unit and may separately set the remaining reference direction (prediction direction) information or a reference picture index. In this case, when the additional candidate motion information generating unit 1540 generates additional candidate motion information by using motion information of an available prediction unit, the additional candidate motion information generating unit 1540 may generate reference direction information according to a slice type of a current prediction unit. For example, when a current prediction unit is included in a P slice, a reference direction included in the additional candidate motion information is set as the direction L0. When a current prediction unit is included in a B slice, a reference direction may be set as a bi-direction including prediction of the directions L0 and L1. In addition, the additional candidate motion information generating unit 1540 may set a reference picture index within a range among (0~the reference picture index of available prediction unit) and may add a plurality of reference picture indexes to additional candidate motion information.

When the additional candidate motion information generating unit 1540 generates the reference picture index, the additional candidate motion information generating unit 1540 may use a reference picture index indicating a reference picture having the highest frequency from among reference pictures included in motion information of available spatial prediction units and temporal prediction units or may use a reference picture index indicating a reference picture that is referred to by the most adjacent prediction units of a current prediction unit, instead of setting a reference picture index having a predetermined value, as described above.

In addition, when the number of pieces of default candidate motion information generated by the spatial candidate motion information generating unit 1510 and the temporal candidate motion information generating unit 1520 is less than a predetermined number 'n', the additional candidate motion information generating unit 1540 may omit a process for checking whether additional candidate motion information included in candidate motion information is duplicated such that the total number of pieces of candidate motion information may be 'n'. That is, the additional candidate motion information generating unit 1540 may add additional candidate motion information generated by changing default motion information to the candidate motion information even though the additional candidate motion information is the same as default motion information.

Figure 22:
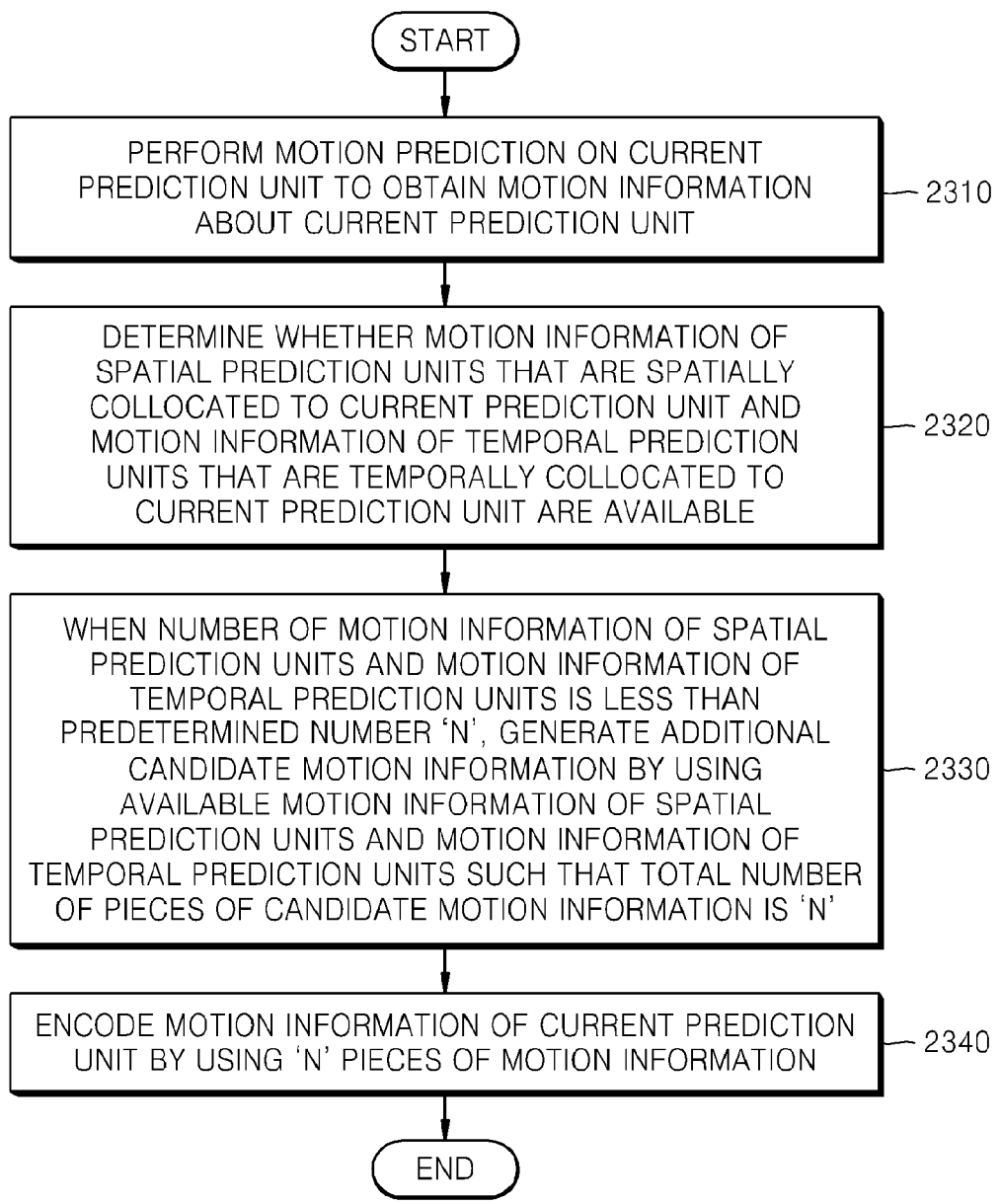
FIG. 22 is a flowchart of a method of encoding a motion vector, according to an exemplary embodiment.

FIG. 22 is a flowchart of a method of encoding a motion vector, according to an exemplary embodiment.

Referring to FIG. 22, in operation 2310, the motion estimator 420 performs motion prediction on a current prediction unit to obtain motion information about the current prediction unit.

In operation 2320, the candidate motion information generating unit 1410 determines whether motion information of spatial prediction units that are spatially collocated to a current prediction unit and motion information of temporal prediction units that are temporally collocated to the current prediction unit are available. As described above, the candidate motion information generating unit 1410 checks whether motion information of adjacent prediction units A0 and A1 positioned on the left of the current prediction unit and motion information of adjacent prediction units B0, B1, and B2 positioned above the current prediction unit are available and may add motion information of an available adjacent prediction unit to default candidate motion information. In addition, the candidate motion information generating unit 1410 checks whether motion information of prediction units of a predetermined location from among prediction units of a previous picture is available and may add the motion information of the previous picture to the default candidate motion information.

In operation 2330, when the number of pieces of motion information of spatial prediction units and temporal prediction units is less than a predetermined number 'n', the candidate motion information generating unit 1410 may generate additional candidate motion information by using motion information of available spatial prediction units and temporal prediction units such that the total number of pieces of candidate motion information may be 'n'.

In operation 2340, the motion information encoder 1420 encodes motion information of the current prediction unit by using n pieces of motion information. In detail, the motion information encoder 1420 determines most similar motion information to motion information of a current prediction unit from among the generated candidate motion information and transmits index information indicating the determined motion information. For example, when motion information is a motion vector, the candidate motion information generating unit 1410 generates prediction motion vector candidates of the current prediction unit and the motion information encoder 1420 may encode information about an index value indicating a most similar prediction motion vector to the motion vector of the current prediction unit from among prediction motion vector candidates and information about a difference value between the motion vector of the current prediction unit and the prediction motion vector.

Figure 23:
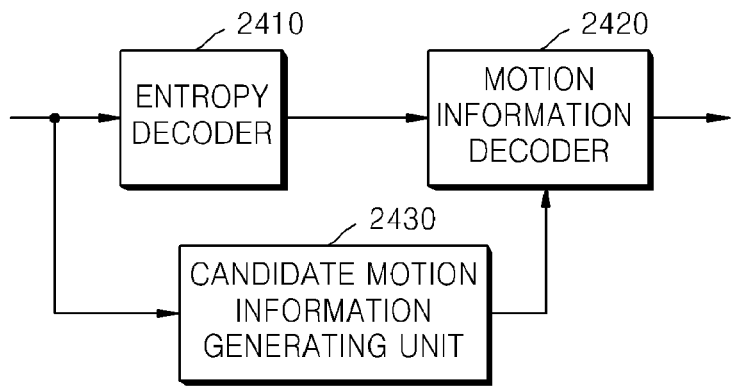
FIG. 23 is a block diagram of a motion vector decoding apparatus according to an exemplary embodiment.

FIG. 23 is a block diagram of a motion vector decoding apparatus 2400 according to an exemplary embodiment.

Referring to FIG. 23, the motion vector decoding apparatus 2400 includes an entropy decoder 2410, a motion information decoder 2420, and a candidate motion information generating unit 2430, i.e. a candidate motion information generator.

The entropy decoder 2410 extracts motion information used in a current prediction unit from among candidate motion information from a bitstream. For example, when motion information is a motion vector, the entropy decoder 2410 extracts an index indicating motion information about a prediction motion vector index, a difference value between the prediction motion vector and an original motion vector, reference picture information, and prediction direction information.

Like the candidate motion information generating unit 1410 shown in FIG. 14A, the candidate motion information generating unit 2430 obtains candidate motion information by using motion information of adjacent prediction units that are temporally and spatially collocated to a current prediction unit, and generates additional candidate motion information by using motion information of prediction units that are spatially and temporally collocated to the current prediction unit such that the number of pieces of the candidate motion information is 'n'.

The motion information decoder 2420 obtains a single piece of candidate motion information generated by the candidate motion information generating unit 2430 by using an index indicating motion information of a current prediction unit obtained from a bitstream. As described above, when motion information is a motion vector, the motion information decoder 2420 obtains a single prediction motion vector from among prediction motion vector candidates by using an index indicating the prediction motion vector obtained from a bitstream, extracts information about a difference value between the prediction motion vector and an original motion vector from a bitstream, and then adds the difference value and the prediction motion vector to restore a motion vector of the current prediction unit.

Figure 24:
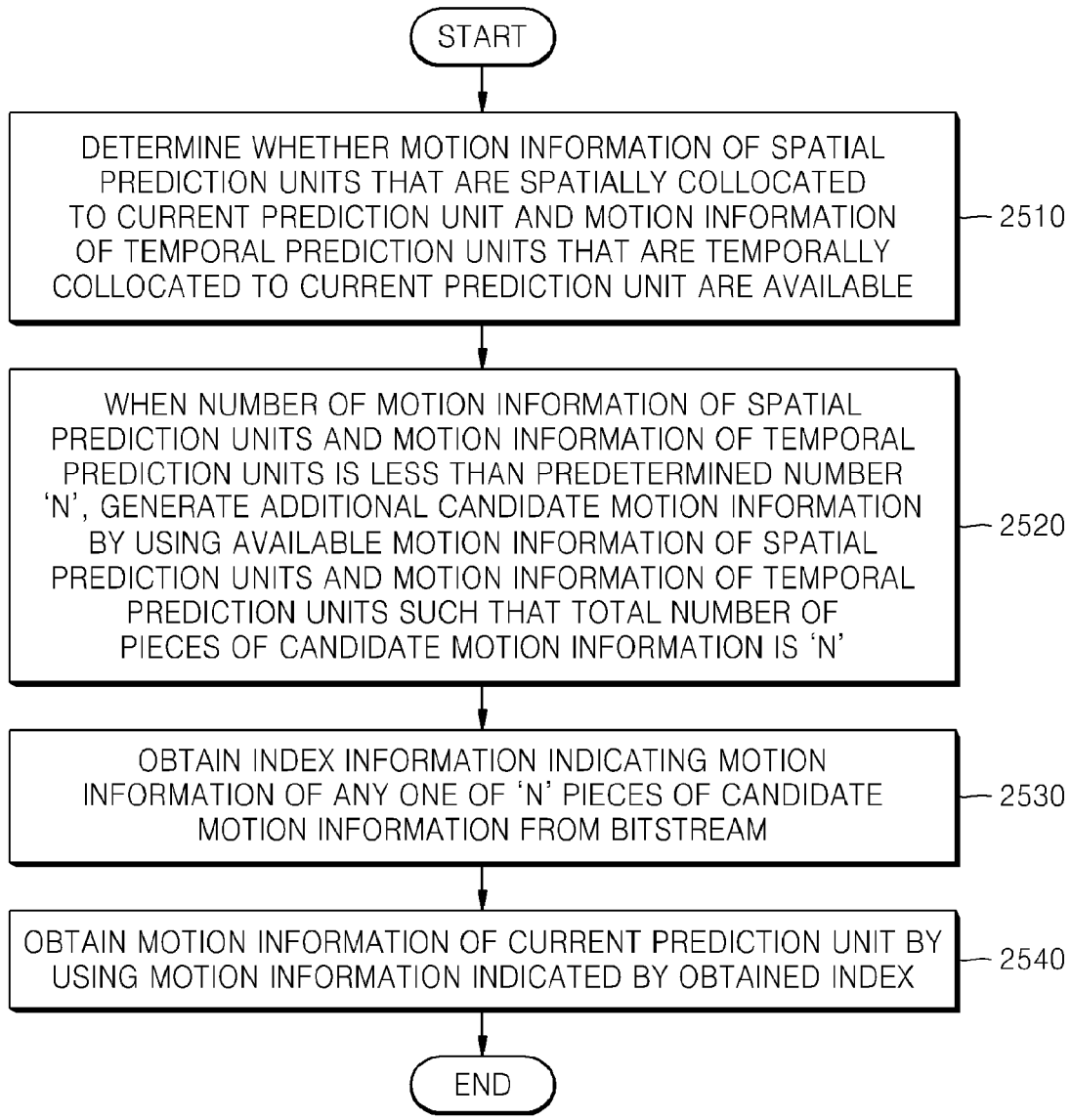
FIG. 24 is a flowchart of a method of decoding motion information, according to an exemplary embodiment.

FIG. 24 is a flowchart of a method of decoding motion information, according to an exemplary embodiment.

Referring to FIG. 24, in operation 2510, the candidate motion information generating unit 2430 determines whether motion information of spatial prediction units that are spatially collocated to a current prediction unit and motion information of temporal prediction units that are temporally collocated to the current prediction unit are available. In operation 2520, as the determination result, when the number of pieces of available motion information of the spatial prediction units and temporal prediction units is less than a predetermined number 'n' (where n is an integer), the candidate motion information generating unit 2430 generates additional candidate motion information by using available motion information of spatial prediction units and temporal prediction units such that the total number of pieces of candidate motion information may be 'n'.

In operation 2530, the entropy decoder 2410 obtains and outputs index information indicating a motion information from among 'n' pieces of candidate motion information from a bitstream. In operation 2540, the motion information decoder 2420 obtains motion information of a current prediction unit by using the motion information indicated by the index. As described above, when motion information is a motion vector, the motion information decoder 2420 obtains a single prediction motion vector from among prediction motion vector candidates by using the index indicating the prediction motion vector obtained from a bitstream, extracts information about a difference value between the prediction motion vector and an original motion vector from a bitstream, and then adds the difference value and the prediction motion vector to restore a motion vector of the current prediction unit.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While several exemplary embodiments have been particularly shown and described, it will be understood by those of ordinary skill in the art that various changes in form and details may be made therein without departing from the spirit and scope of the present invention as defined by the following claims.

What is claimed is:

1. A method of decoding an image, the method comprising:
obtaining, by a decoder comprising a processor, a prediction mode of a current block, from a bitstream;
when the prediction mode of the current block is inter-prediction, obtaining a spatial motion vector predictor candidate of the current block by using a motion vector of an available spatial block spatially related to the current block;
obtaining a temporal motion vector predictor candidate of the current block by using a motion vector of an available temporal block temporally related to the current block;
adding, when a number of the spatial motion vector predictor candidate and the temporal motion vector predictor candidate is smaller than a predetermined number n, where n is an integer equal to two or greater, a zero vector to be a motion vector predictor candidate so that a number of motion vector predictor candidates is to be the predetermined number n; and
obtaining a motion vector predictor of the current block based on information indicating a motion vector predictor among the motion vector predictor candidates,
wherein the spatial motion vector predictor candidate is obtained from neighboring blocks including a lower left block located on a lower left side of the current block, and
wherein,
when a first spatial motion vector predictor candidate is equal to a second spatial motion vector predictor candidate, the second spatial motion vector candidate is removed from the motion vector predictor candidates.

* * * * *